United States Patent
Ishikawa

(10) Patent No.: US 9,703,843 B2
(45) Date of Patent: Jul. 11, 2017

(54) OBJECT PLACEMENT APPARATUS, OBJECT PLACEMENT METHOD AND PROGRAM

(75) Inventor: Kenichiro Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 552 days.

(21) Appl. No.: 14/130,040

(22) PCT Filed: Jun. 29, 2012

(86) PCT No.: PCT/JP2012/066757
§ 371 (c)(1),
(2), (4) Date: Dec. 30, 2013

(87) PCT Pub. No.: WO2013/005684
PCT Pub. Date: Jan. 10, 2013

(65) Prior Publication Data
US 2014/0143274 A1    May 22, 2014

(30) Foreign Application Priority Data
Jul. 1, 2011   (JP) .................. 2011-147571

(51) Int. Cl.
*G06F 17/30* (2006.01)
(52) U.S. Cl.
CPC .. *G06F 17/30545* (2013.01); *G06F 17/30575* (2013.01)
(58) Field of Classification Search
CPC .............. G06F 17/30545; G06F 17/30575
USPC ........................................... 707/770
See application file for complete search history.

(56) References Cited

U.S. PATENT DOCUMENTS

| | | | | |
|---|---|---|---|---|
| 5,778,185 A | * | 7/1998 | Gregerson | ............... G06F 9/50 709/226 |
| 5,819,083 A | * | 10/1998 | Chen | ............... G06F 17/30575 707/999.01 |
| 6,167,427 A | * | 12/2000 | Rabinovich | ......... H04L 67/1002 707/999.202 |
| 6,256,675 B1 | * | 7/2001 | Rabinovich | ............ H04L 29/06 709/225 |
| 6,735,601 B1 | * | 5/2004 | Subrahmanyam | ........ G06F 8/61 707/999.2 |

(Continued)

FOREIGN PATENT DOCUMENTS

| | | |
|---|---|---|
| JP | 2006-139334 A | 6/2006 |
| JP | 2006-185413 A | 7/2006 |

(Continued)

OTHER PUBLICATIONS

Applicant's Ids—JP2008/046700 Englisht translation, Yokota et al. "Distirbuted directory storage device and dat aprocessing request transfer program", Aug. 11, 2006, 18 pages.*

(Continued)

*Primary Examiner* — Kris Mackes
*Assistant Examiner* — Tiffany Bui

(57) ABSTRACT

An apparatus for placement of an object includes a placement site search unit. The placement site search unit searches a placement site of the object based on a first vector element that has organized first identifiers for first placement sites existing in a system and on a second vector element that has organized second identifiers for second placement sites not existing in the system (FIG.1).

7 Claims, 17 Drawing Sheets

(56) References Cited

U.S. PATENT DOCUMENTS

| | | | | |
|---|---|---|---|---|
| 8,868,508 B2* | 10/2014 | Drobychev | ....... | G06F 17/30082 707/640 |
| 2004/0064556 A1* | 4/2004 | Zhang | ............... | G06F 17/30067 707/999.01 |
| 2004/0225952 A1* | 11/2004 | Brown | ...................... | G06F 8/20 714/819 |
| 2006/0168154 A1* | 7/2006 | Zhang | ................. | G06F 11/1662 707/E17.005 |
| 2008/0209007 A1* | 8/2008 | Gurecki | ............ | G06F 17/30545 707/E17.032 |
| 2010/0082551 A1* | 4/2010 | Kathuria | ........... | G06F 17/30575 707/674 |
| 2011/0072206 A1* | 3/2011 | Ross | ...................... | G06F 17/302 711/108 |
| 2013/0124546 A1* | 5/2013 | Wormley | .............. | H04L 63/101 707/758 |

FOREIGN PATENT DOCUMENTS

| JP | 2007-73003 A | 3/2007 |
|---|---|---|
| JP | 2007-74490 A | 3/2007 |
| JP | 2008-46700 A | 2/2008 |

OTHER PUBLICATIONS

James Aspnes et al., "Skip Graphs", ACM Transactions on Algorithms, vol. 3, Article 37, Nov. 2007, arXiv:cs/0306043v1 [cs.DS], Jun. 10, 2003, Internet <URL: http://doi.acm.org/10.1145/1290672.1290674>.

Ion Stoica et al., "Chord: A Scalable Peer-to-Peer Lookup Protocol for Internet Applications", IEEE/ACM Transactions on Networking, vol. 11, No. 1, Feb. 2003, pp. 17-32.

David Karger et al., "Consistent Hashing and Random Trees: Distributed Caching Protocols for Relieving Hot Spots on the World Wide Web", In Proceedings of the Twenty-ninth annual ACM symposium on Theory of computing (STOC '97), 1997, pp. 654-663, Internet <URL: http://doi.acm.org/10.1145/258533.258660>.

Sage A. Weil et al., "CRUSH: Controlled, Scalable, Decentralized Placement of Replicated Data", In Proceedings of the 2006 ACM/IEEE conference on Supercomputing (SC '06), Tampa, Florida USA. Article No. 122, Nov. 2006, Storage Systems Researc Center, University of California, Santa Cruz, Internet <URL: http://doi.acm.org/10.1145/1188455.1188582>.

International Search Report for PCT Application No. PCT/JP2012/066757, mailed on Jul. 31, 2012.

* cited by examiner

FIG. 15

| | | | | | | | |
|---|---|---|---|---|---|---|---|
| Lev02(1) | ○ ↕ | | | | ○ ↑ | | |
| Lev02(0) | ○ ↕ | ○ ↕ | | | ○ ↑ | | |
| STORAGE DEVICE | | | 20a | 20b | 20c | | 20d | 20e |
| STORAGE DEVICE NO. | 1 | 2 | 1 | 3 | 4 | 5 | 6 | 7 |
| NON-EXISTING STORAGE DEVICE NO. | 0 | 0 | 0 | 1 | 0 | 1 | 1 | 1 |
| VC02 | 1 | 1 | 1 | 1 | 0 | 1 | 1 | 1 |

OBJECT PLACEMENT APPARATUS, OBJECT PLACEMENT METHOD AND PROGRAM

TECHNICAL FIELD

Description of Related Application

The present application is a National Stage Entry of PCT/JP2012/066757 filed Jun. 29, 2012, which is based on and claims the benefit of Japanese Patent Application No. 2011-147571, filed on Jul. 1, 2011, the disclosures of all of which are hereby incorporated by reference herein in their entirety.

This invention relates to an object placement apparatus, an object placement method and a corresponding program. More particularly, it relates to an object placement apparatus, an object placement method and a program for searching an object placed in a preset placement site.

BACKGROUND

For a case where data to be retained, referred to below as object data, is retained in a plurality of sites for placement, there is known such a technique that the object data is retained in a substantially evenly distributed state in the individual sites for placement. By using such technique, and simultaneously accessing a plurality of sites for placement, it is possible to improve the performance of access to the object data.

However, in accessing the object data, retained distributed in the multiple sites for placement, by such technique, it is necessary to search the placement site retaining the object data, that is, to identify the site for placement retaining the object data being accessed.

In Patent Literature 1 and in Non-Patent Literatures 1 to 4, there are disclosed methods in which the relationship of correspondence between the object data and the sites for placement is determined on the basis of the information proper to the object data using a preset algorithm. Such information is referred to below as an identifier. In the method employing the identifier, the above mentioned algorithm is used in accessing the object data to decide from such identifier on the placement site in which the object data is stored.

There exist two sorts of methods to check for the placement site holding the object data on memory with the use of the above mentioned algorithm.

In the first method, a device executing the method of deciding on the placement site holding on memory the object data, referred to below as a decision device, stores the total of the sites for placement likely to be holding the object data on memory.

In the second method, the decision device stores a part of the sites for placement likely to be holding the object data on memory. This second method is disclosed in the Non-Patent Literatures 1 and 2.

[Patent Literature 1]
JP Patent Kokai Publication No. JP2007-073003A

NON-PATENT LITERATURES

[Non-Patent Literature 1]
James Aspnes and Gauri Shah "Skip graphs", ACM Transactions on Algorithms, Vol. 3, Article 37, November 2007, [online], [retrieved on Jun. 22, 2011], Internet <URL: http://doi.acm.org/10.1145/1290672.1290674>

[Non-Patent Literature 2]
Ion Stoica, Robert Morris, David Liben-Nowell, David R. Karger, M. Frans Kaashoek, Frank Dabek and Hari Balakrishnan, "Chord: A Scalable Peer-to-Peer Lookup Service for Internet Applications", IEEE/ACM Transactions on Networking, Vol. 11, February 2003, p 17-32

[Non-Patent Literature 3]
David Karger, Eric Lehman, Tom Leighton, Rina Panigrahy, Matthew Levine and Daniel Lewin, "Consistent Hashing and random trees: distributed caching protocols for relieving hot spots on the World Wide Web", In Proceedings of the Twenty-ninth annual ACM symposium on Theory of computing (STOC '97), 1997, p 654-663, [online], [retrieved on Jun. 22, 2011], Internet <URL: http://doi.acm.org/10.1145/258533.258660>

[Non-Patent Literature 4]
Sage A. Weil and Scott A. Brandt, Ethan L. Miller, Carlos Maltzahn, "Crush: controlled, scalable, decentralized placement of replicated data", In Proceedings of the 2006 ACM/IEEE conference on Supercomputing (SC '06), 2006, Article 122, [online], [retrieved on Jun. 22, 2011], Internet <URL: http://doi.acm.org/10.1145/1188455.1188582>

SUMMARY

The disclosures of the above related stated related art technical literatures are incorporated herein by reference. The following analysis is from the viewpoint of the present invention.

In the above mentioned first method, the volume of the information that should be shared by the total of the decision devices is increased with increase in the number of sites for placement, thus limiting the scalability. On the other hand, in the second method, in which just the information concerning a part of the sites for placement is held on memory, the amount of the information that should be shared is smaller, and hence the scalability is high as compared to the first method.

However, in the second method, in which each decision device stores just the information concerning a fraction of the sites for placement, it is necessary for respective decision devices to separately search the sites for placement holding the target object data on memory from one object data to another. In such case, the sites for placement holding the target object data on memory should be searchable, that is, identifiable, without regard to from which decision device the search is initiated. In addition, if the performance of access to the object data is taken into account, the number of times of decisions in each decision device and the number of the sites for placement to be retained by each decision device should be small.

In Non-Patent Literature 1, there is disclosed such a method in which the decision device searches the sites for placement, holding the object data, as the decision device retains or stores the information concerning a part of the sites for placement existing in a system, as discussed above. In system management, it may sometimes occur that sites for placement, non-existing in a system, are designated as the sites for placement holding data on memory. It is noted that, in the method disclosed in Non-Patent Literature 1, the sites for placement non-existing in the system are not taken into account, thus deteriorating the access performance (a placement site in question may be determined to be non-existent only by a time-consuming operation).

The related techniques suffer from problems that remain unsolved, as discussed above. Thus, a need exists for an object placement apparatus, an object placement method and a corresponding program, with which the access performance may be prevented from being deteriorated even in case a non-existent placement site is designated.

In a first aspect of the present disclosure, there is provided an apparatus for object placement comprising a placement site search unit that searches a placement site of an object based on a first vector element that has organized first identifiers for first placement sites existing in a system and on a second vector element that has organized second identifiers for second placement sites not existing in the system.

In a second aspect of the present disclosure, there is provided a method for object placement comprising generating a first vector element that has organized first identifiers for first placement sites existing in a system, generating a second vector element that has organized second identifiers for second placement sites not existing in the system, and searching a placement site for an object based on the first and second vector elements.

In a third aspect of the present disclosure, there is provided a program that allows a computer to perform a processing of generating a first vector element that has organized first identifiers for first placement sites existing in a system, a processing of generating a second vector element that has organized second identifiers for second placement sites not existing in the system, and a processing of searching a placement site for an object based on the first and second vector elements. The computer operates as an apparatus for object placement.

This program may be recorded on a computer readable recording medium. The recording medium may be a non-transient recording medium, such as a semiconductor memory, a hard disk, a magnetic recording medium or an optical recording medium. The present invention may also be implemented as a computer program product.

In the respective aspects of the present invention, there may be provided an apparatus for object placement, a method for object placement and a program, whereby it is possible to prevent the access performance from being worsened even in case a non-existent placement site is designated.

BRIEF DESCRIPTION OF THE DRAWINGS

FIG. 15 is a graphic view for illustrating calculations of the information concerning the neighbored non-existing storage devices.

PREFERRED MODES

Initially, an outline of an exemplary embodiment will be explained with reference to FIG. 1. It should be noted that symbols for reference to the drawings, as used in the present outline, are annexed to respective parts or components merely to assist in the understanding and are not intended to limit the present invention to a mode illustrated.

In the method disclosed in Non-Patent Literature 1, the sites for placement non-existent in the system are not taken into account, as discussed above. Thus, if the object placement site is non-existent, the access performance may be deteriorated. There is thus a demand for an object placement apparatus, an object placement method and a corresponding program, in which, even in case a placement site non-existent in a system has been designated, the access performance is not deteriorated.

Figure 1:
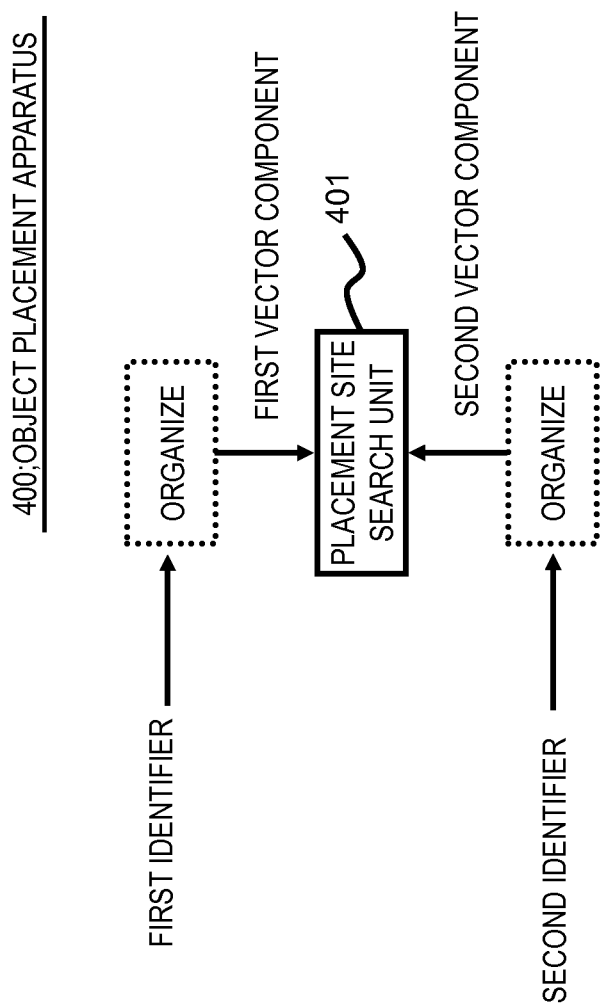
FIG. 1 is a schematic view for illustrating the gist of an exemplary embodiment.

With this in view, an object placement apparatus 400, shown for example in FIG. 1, is presented. The object placement apparatus 400, shown in FIG. 1, includes a placement site search unit 401 that searches a placement site for an object based on a first vector component or vector element and a second vector component or vector element present in a system. The first vector component has organized first identifiers for first placement sites existing in the system, while the second vector component has organized second identifiers for second placement sites non-existing in the system.

Each of the object placement apparatus 400, one of which is shown in FIG. 1, has a unique identifier. It is on the basis of such identifier that a placement site of an object is decided on. Moreover, each object placement apparatus searches the placement site of the object based on the first vector component which has organized the first identifiers for first sites for placement existing in a system, and on the second vector component which has organized the second identifiers for second sites for placement non-existing in the system. By the identifier is meant such information that allows for decision as to the large-small or far-near relationship among the respective identifiers.

Further, the first and second identifiers are organized to calculate first and second vector elements. By the processing of organizing the identifiers is meant forming a hierarchy of the identifiers based on the total number of the sites for placement existing in the system and extracting a placement site neighbored to a given placement site from one level of the identifier hierarchy to another. Following the organizing processing, a further placement site thought to be near the target placement site is selected, from one level of the identifier hierarchy to another, and such further placement site is taken to be a movement destination, thereby allowing for searching the object placement site to good efficiency. At this time, not only the information concerning the placement sites existing in the system (first identifiers) but also the information concerning the placement sites non-existing in the system (second identifiers) is used. By so doing, even in such a case where a placement site non-existing in the system is designated as a placement site holding an object on memory, it can be determined at once that the placement site designated is the placement site non-existing in a system.

Viz., suppose that a placement site is searched by relying on the information concerning the placement sites existing in a system, and a placement site non-existing in a system is designated. It cannot then be determined that the placement site designated is non-existing in the system unless movement has been made to the object storage device neighbored to the non-existing placement site, that is, the placement site which should positively be holding the information on memory if such non-existing placement site were an existing site. However, if the information concerning the sites for placement non-existing in the system is provided from the outset, it can be promptly determined that the placement site designated is a placement site non-existing in the system. As a result, even in case a placement site non-existing in the system should be designated, it is possible to prevent deterioration of the access performance.

Next, such items or matters that are common to respective exemplary embodiments will be explained in detail.

Figure 2:
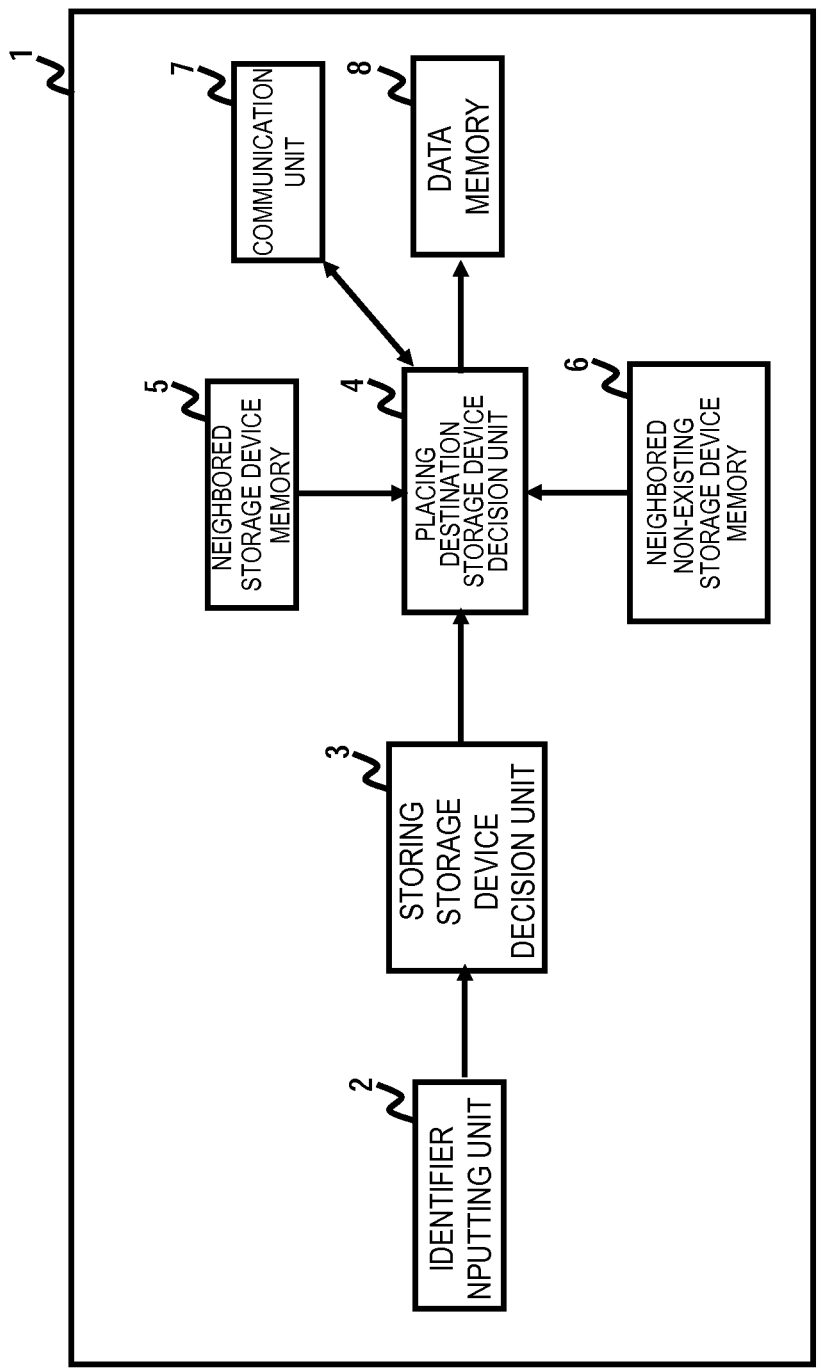
FIG. 2 is a block diagram showing an example inner configuration of a storage device 1.
Figure 3:
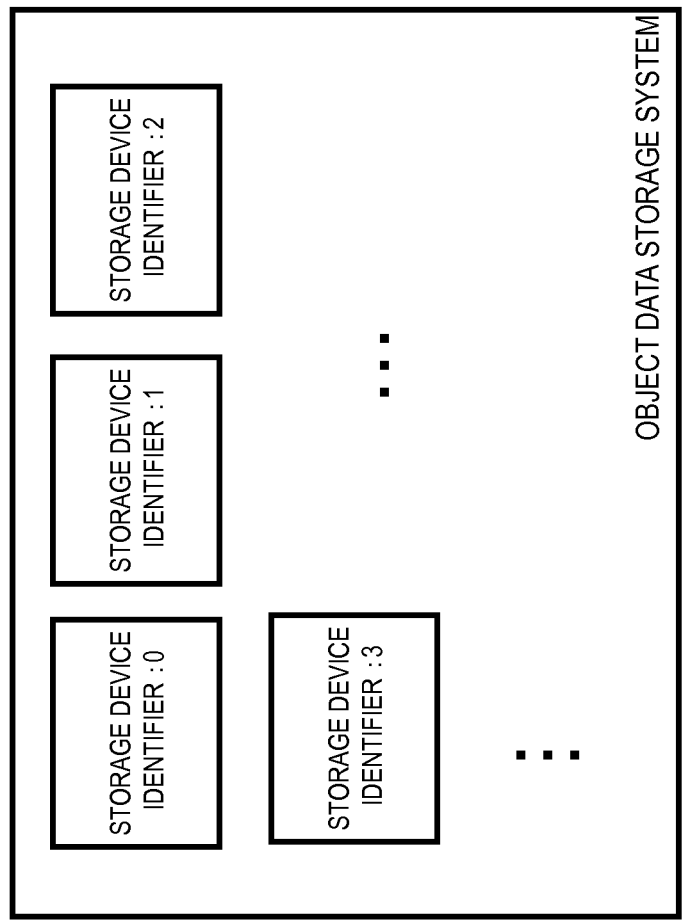
FIG. 3 is a block diagram showing an example configuration of a system for storing object data.

In the description to follow, a placement site for an object, or an object placement apparatus, is assumed to be a storage device A plurality of storage devices 1 (object placement apparatus), each of which is shown in FIG. 2, are provided to compose a system that stores the objects (see FIG. 3). The system, holding object data on memory, is made up by a plurality of the storage devices, each having a unique identifier. In the system shown in FIG. 3, those object data having the same identifier are to be retained at all times in the same storage device.

The storage device 1, shown in FIG. 2, includes an identifier inputting unit 2, a storing storage device decision unit 3, a placing destination storage device decision unit 4, a neighbored storage device memory 5, a neighbored non-existing storage device memory 6, a communication unit 7 and a data memory 8.

The identifier inputting unit 2 accepts identifiers of the object data.

The storing storage device decision unit 3 decides on a storage device that holds object data on memory. The storing storage device decision unit 3 is equivalent to a placement site decision unit as stated later on.

The placing destination storage device decision unit 4 decides on a storage device that holds on memory the object data designated by an access command, or on a storage device having the identifier closer to the identifier of the storage device that holds on memory the object data designated by the access command. The placing destination storage device decision unit is equivalent to the placement site search unit 401 referred to above.

If, as a result of decision by the placing destination storage device decision unit 4, the storage device which is no other than that which accepted the access command is holding the object data on memory, such storage device accesses the object data using its data memory 8. The result is returned to the storage device that issued the access command.

If, as a result of the decision by the placing destination storage device decision unit 4, it is concluded that some other storage device is holding the object data on memory, the storage device 1 transfers, by its communication unit 7, the access command to the storage device decided on by the placing destination storage device decision unit 4. As the case may be, the result of decision made by the placing destination storage device decision unit 4 of some other storage device may also be used.

The placing destination storage device decision unit 4 may refer to the neighbored storage device information retained in the neighbored storage device memory 5 or to the neighbored non-existing storage device information retained in the neighbored non-existing storage device memory 6. The placing destination storage device decision unit 4 decides on a storage device, which is to be the access command transferring destination, based on the information concerning neighbored storage devices and the information concerning the neighbored non-existing storage devices. The information concerning the neighbored storage devices and the information concerning the neighbored non-existing storage devices will be explained in detail subsequently.

The placing destination storage device decision unit 4 decides, as the transferring destination storage device, the storage device that allows movement to the storage device holding the object data on memory to the maximum efficiency based on the information concerning the neighbored storage devices and the information concerning the neighbored non-existing storage devices. It is noted that, in deciding the storage device that will permit movement to the storage device holding the object data on memory to the maximum efficiency, the following may be thought of, only by way of illustration.

Initially, the storage device holding the object data on memory is accessed using only the information concerning the neighbored non-existing storage devices. Ultimately, movement is made to the storage device holding the object data on memory, using the information concerning the neighbored storage device. Or, the movement is made to the storage device holding the object data, using both the information concerning the neighbored storage devices and the information concerning the neighbored non-existing storage devices from the outset.

It is noted that the information concerning the neighbored storage devices and the information concerning the neighbored non-existing storage devices may be accepted from outside, or generated within the storage device, as described above.

A part or the total of the information concerning the storage devices, existing in the system, is retained in the neighbored storage device memory 5 as the neighbored storage device information. It is noted that, in consideration of system scalability, such a case where the information retained by the neighbored storage device memory 5 is the information concerning a part of the storage devices existing in the system is predominant.

Each of the storage devices, existing in the system, has a unique identifier, such as a number. For selecting the object data storing storage device, from among the total of the storage devices, using the unique identifier, the following methods may be thought of, only by way of illustration:

To select the storing storage device, from among the total of the storage devices, the storing storage device may be selected from among the storage devices managed by a table in accordance with a preset reference, such as a reference to select storage devices in the order of larger values of the storage capacity. Or, the storing storage device may be selected, from among the storage devices, managed by a table, in accordance with a preset algorithm, for example, using a random number in which an identifier is used as a seed.

The neighbored non-existing storage device memory 6 is holding on memory, as the information concerning the neighbored non-existing storage devices, part or all of the combinations of the identifiers having no matched storage devices in the system and the storage devices that manage the identifiers. Viz., the information concerning the neighbored storage devices is the information concerning the storage devices existing in the system, and the information concerning the neighbored non-existing storage devices is the information concerning the identifiers having no matched storage devices in the system and the information concerning the storage devices managing the identifiers.

To select the information to be retained in case there is no storage device managing the identifiers, such a method may be thought of in which an upper limit identifier and a lower limit identifier are linked together in a ring form. In case the identifier of the storage device managing it exceeds the upper limit, such a storage device having the identifier closest to the lower limit of the identifier is selected. In case the identifier of the storage device managing it exceeds the lower limit, such a storage device having the identifier closest to the upper limit of the identifier is selected. It is noted that such method is given only by way of illustration. It may be thought to select one out of a plurality of combinations of the identifiers having no matched storage devices and the storage devices managing the identifiers as a combination for retention.

In this manner, the information concerning the storage devices existing in the system (information concerning the neighbored storage devices) and the information concerning the storage devices non-existing in the system (information concerning the neighbored non-existing storage devices) are retained in combination. By so doing, the storage device storing the object data targeted by the access command may be reached with a smaller number of hops.

In case the identifiers of storage devices non-existing in the system are set densely within a range that can be assumed by the identifiers, the merit of using the information concerning the storage devices non-existing in the system becomes apparent. The identifiers being densely set means that the number of the storage devices existing in the system is appreciably greater than the number of the storage devices non-existing in the system. It is now assumed that, under such situation, a storage device non-existing in the system is designated as the storing storage device. In such case, it is apparently more efficient to decide that the storage device is non-existent by using the identifiers of the smaller number of storage devices non-existent in the system than in the case of using the identifiers of the numerous storage devices existing in the system. More specifically, the number of hops on the order of O(log(the number of identifiers for which there exist no matched existing nodes)) is needed in contrast to the number of hops on the order of O(log(number of storage devices)) needed in the case of the method disclosed in Non-Patent Literature 1, as an example.

Next, placement and search of object data will be explained in more detail.

Here, a storage device that decides on another storage device, which is the transfer destination, using only the information concerning the storage devices existing in the system, will be explained.

Figure 4:
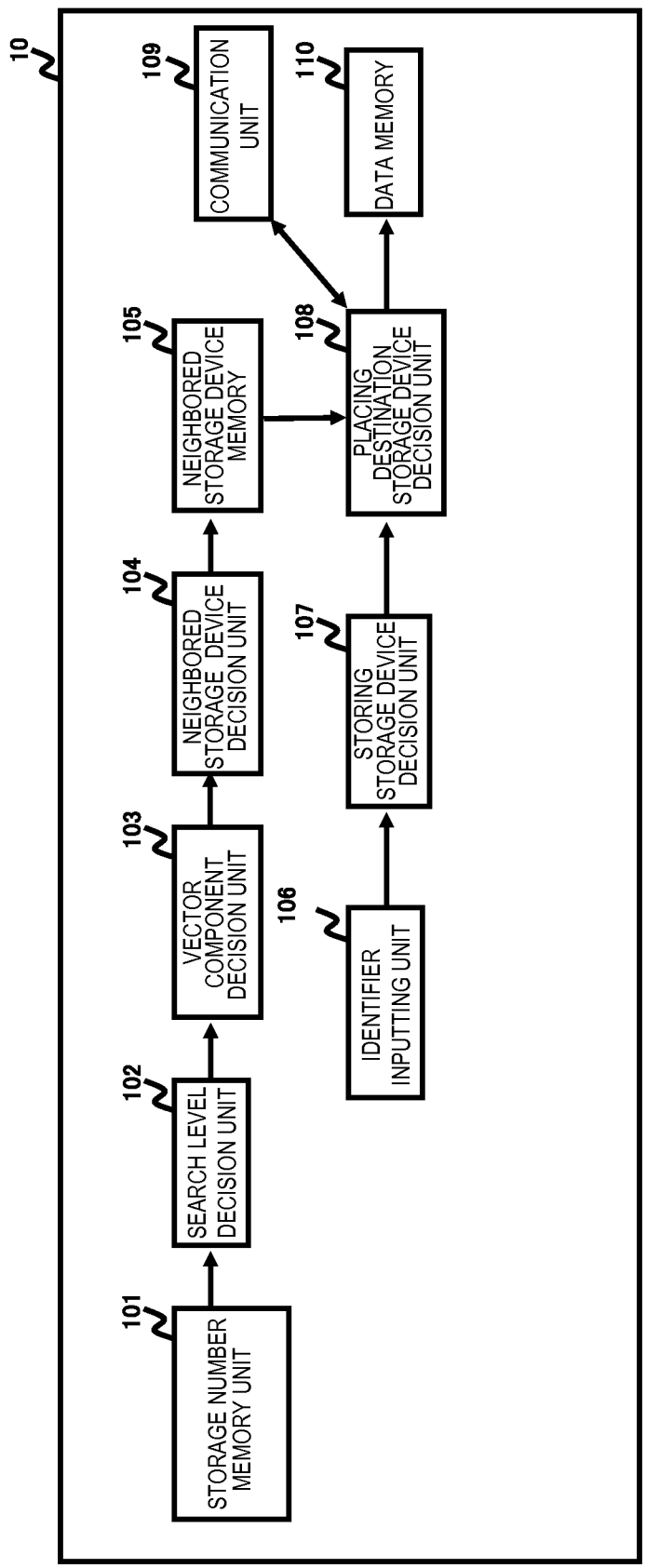
FIG. 4 is a block diagram showing an example inner configuration of a storage device 10.

FIG. 4 shows an example inner configuration of a storage device 10.

The storage device 10 decides on a storing storage device, viz. a storage device that retains object data accepted from outside, with the use of the identifier.

The storage device 10 is made up of a storage number memory unit 101, a search level decision unit 102, a vector component decision unit 103, a neighbored storage device decision unit 104, a neighbored storage device memory 105, an identifier input unit 106, a storing storage device decision unit 107, a placing destination storage device decision unit 108, a communication unit 109 and a data memory 110.

The storage number memory unit 101 counts the number of storage devices existing in the system and retains the counted number.

The search level decision unit 102 calculates the search levels from the number of storage devices existing in the system. The search level corresponds to the number of levels in the above mentioned hierarchy.

The vector component decision unit 103 calculates a vector component (vector element) of the storage device 10 based on the search levels calculated by the search level decision unit 102.

The neighbored storage device decision unit 104 generates the neighbored storage device information to be retained by the neighbored storage device memory 105.

The neighbored storage device memory 105 retains the neighbored storage device information generated by the neighbored storage device decision unit 104.

The identifier input unit 106 accepts the information concerning the object data identifiers for object data or the information concerning the storing storage device storing the object data.

In case of not receiving the information concerning the storing storage device, the storing storage device decision unit 107 decides on the storing storage device based on e.g., an object data identifier.

The placing destination storage device decision unit 108 determines whether or not the object data is being stored by the storage device 10 itself. In case the object data is not so stored, the placing destination storage device decision unit 108 decides on the storage device of the access command transfer destination from the neighbored storage device information retained in the neighbored storage device memory 105 and the information concerning the storing storage device.

The communication unit 109 communicates with other storage devices or external devices. It is noted that, although in FIG. 4 the communication unit 109 receives the information from the placing destination storage device decision unit 108 and hence is connected thereto, it should be possible for the communication unit to exchange the information with other parts within the storage device 10 as necessary.

The data memory 110 retains object data.

The method for deciding on a storing storage device by the storage device 10 will now be explained.

Figure 5:
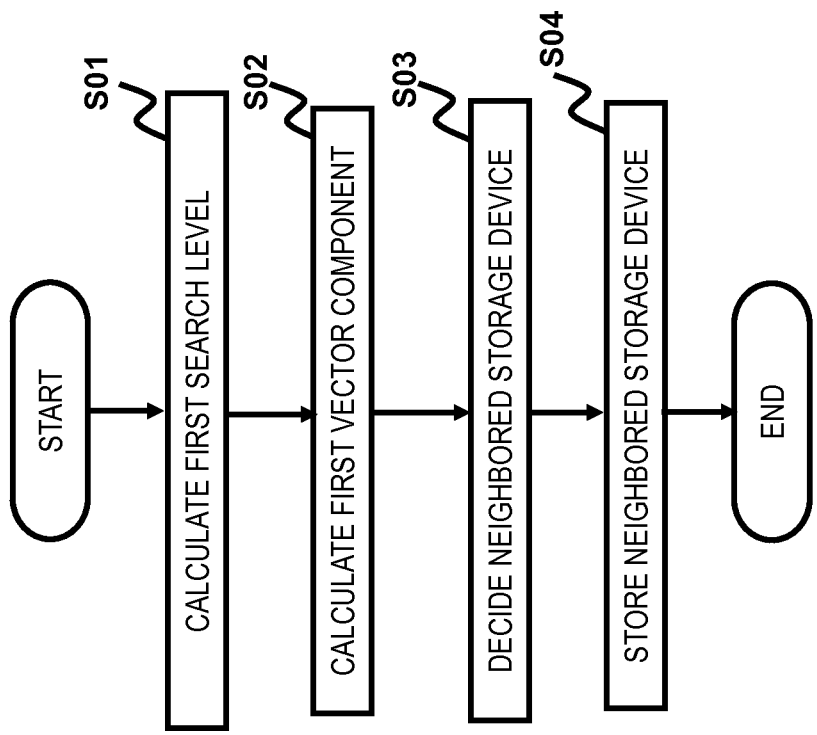
FIG. 5 is a flowchart showing an example method for deciding on a storing storage device by the storage device 10.

FIG. 5 depicts a flowchart showing an example method to decide on the storing storage device by the storage device 10. The storage number memory unit 101 is storing the number SNO of storage devices that are able to retain object data.

In a step S01, the search level decision unit 102 calculates a log of the number SNO of the storage devices 10 to the base of 2. The search level decision unit then rounds up the subdecimal part of the log value obtained by the calculations and subtracts 1 from the rounded number. The result is set as a first search level Lev01. In case the first search level Lev01 is negative (minus), the first search level Lev01 is set to 0.

In a step S02, the vector component decision unit 103 calculates a hash value from a storage device identifier SID. It is noted that the storage device identifier SID is such information that allows concluding that a given storage device identifier SID is smaller than, greater than, nearer to or farther from another one of the storage device identifiers SID. A possible example of such information is a set of integers arrayed in a progressively increasing or decreasing order.

The calculated hash value is expressed in binary notation and put to calculations to find a remainder so that the number of digits corresponds to the first search level Lev01. The result of the calculations to find the remainder is set as a first vector component VCO1.

In a step S03, the neighbored storage device decision unit 104 decides on a neighbored storage device with the use of an algorithm A. The algorithm A will be explained subsequently.

In a step S04, the information concerning the neighbored storage device, as decided on by the neighbored storage device decision unit 104, is stored in the neighbored storage device memory 105.

Next, a method for deciding on a storage device of the transfer destination by the storage device 10 will be explained. Initially, the identifier input unit 106 accepts an object data identifier via an access command. The storing storage device decision unit 107 then decides on the storing storage device based on the object data identifier. The storing storage device is a storage device that is storing the object data. The method for deciding on the storing storage device will be explained in an Example subsequently.

It is then confirmed in the placing destination storage device decision unit 108 that the storage device 10 itself is not the storing storage device. Then, using an algorithm B, a neighbored storage device which is between the storage device 10 and the storing storage device and which is closest to the storing storage device is selected. At this time, the information concerning the neighbored storage devices, retained in the neighbored storage device memory 105, is used. The algorithm B will be explained subsequently.

There is a possibility that the storing storage device, storing object data, is among the neighbored storage devices selected by the algorithm B. Thus, in case the storage device 10 itself is the storing storage device, object data stored in the data memory 110 is accessed and the information is returned to the device that issued the access command if such is necessary. In case a neighbored storage device is selected by the algorithm B, the placing destination storage device decision unit 108 transfers the access command to the neighbored storage device, as selected by the algorithm B, using the communication unit 109.

Next, the algorithm A will be explained.

The algorithm A is such algorithm that selects the neighbored storage device for each value of the first search level. The algorithm A is the processing equivalent to the above mentioned organizing processing.

Figure 6:
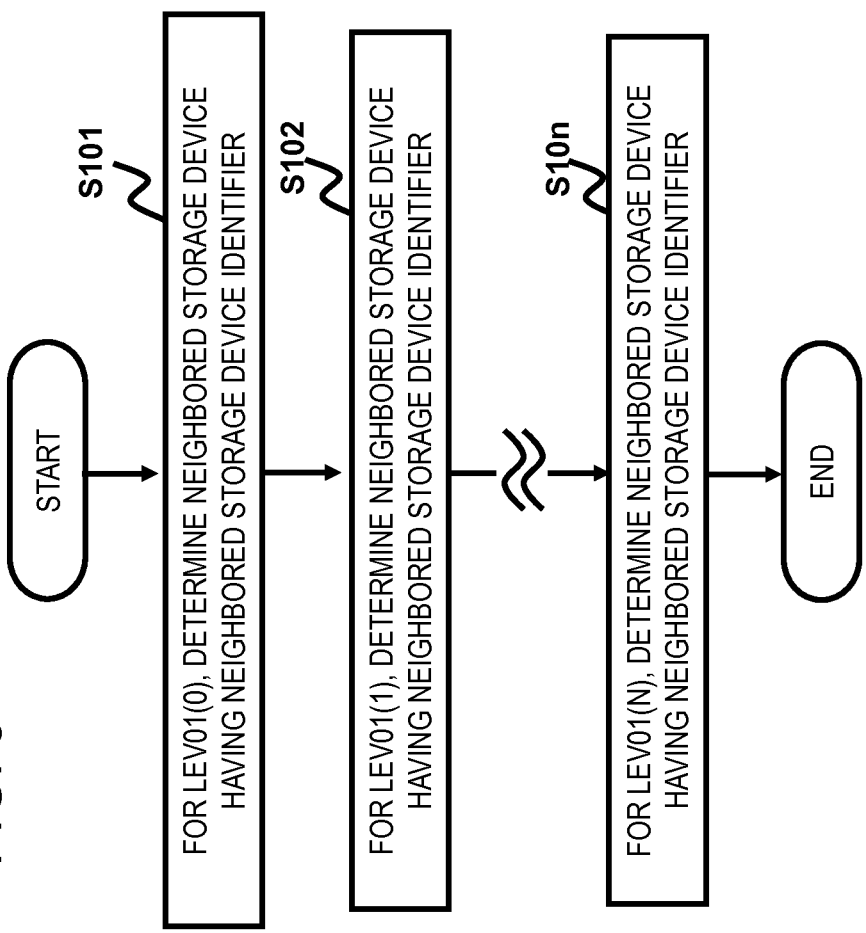
FIG. 6 is an example flowchart for illustrating an algorithm A.

FIG. 6 depicts an example flowchart to illustrate the algorithm A.

In case the value of the first search level Lev01 is 0, a storage device(s) on which there is an indication that it is neighbored to the storage device 10 is stored (step S101). In determining that the storage device in question is neighbored, a storage device identifier SID is used. Viz., if the storage device identifier SID used is an integer, a storage device(s) having the storage device identifier SID just ahead or in rear of the storage device identifier of the storage device 10 is stored.

The case in which the value of the first search level Lev01 is 0 is expressed by Lev01(0). Similarly, the case in which the value of the first search level Lev01 is 1 is expressed by Lev01(1) and the case in which the value it is n is expressed by Lev01(n).

Next, concerning Lev01(1), such storage device that is among the storage devices having the same upper one digit of the vector component VCO1 as that of the storage device 10 and that has the storage device identifier SID neighbored to that of the storage device 10 itself is stored (step S102).

Similarly, concerning Lev01(n), such storage device that is among the storage devices having the same upper (n) digits of the vector component VCO1 as those of the storage device 10 and that has the storage device identifier SID neighbored to that of the storage device 10 is stored (step S10n).

It may occur that a storage device having the same upper (n) digits of the vector component VCO1 as those of the storage device 10 cannot be found down to the storage device having the storage device identifier SID closest to its lower limit. In such case, the fact that there exists no storage device having the storage device identifier SID closer to the lower limit is stored. Or, the upper and lower limits of the storage device identifier SID may be assumed to be connected together to form a ring and neighbored storage devices may be stored. The same applies for a case in which a storage device having the same upper (n) digit of the vector component VCO1 as those of the storage device 10 cannot be found up to the storage device having the storage device identifier SID closest to its upper limit.

Next, a concrete example to decide on the neighbored storage device by the algorithm A is shown.

Figure 7:
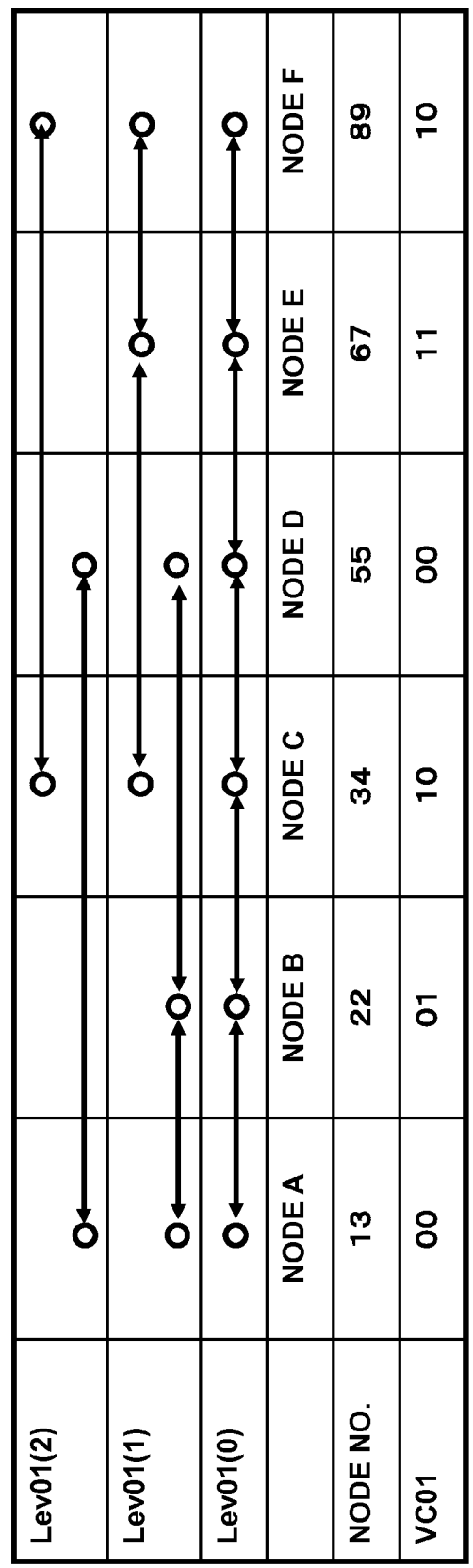
FIG. 7 is a graphic view for illustrating the algorithm A.

FIG. 7 is a graphic view for illustrating the algorithm A.

In FIG. 7, it is assumed that there are six storage devices from a node A down to a node F. Since there are the six storage devices, the number of levels of the first search level Lev01 is 2. The storage devices of from the level A to the level F have respective node numbers in the form of the storage device identifiers SID and, since the number of levels of the first search level Lev01 is 2, a two-digit first vector component VCO1 is calculated. This calculation is now explained by taking the node C as an example.

In Lev01(0), the storage devices neighbored to the node C are stored. Hence, the nodes B and D are stored.

In Lev01(1), the storage device that has the same upper one digit of the first vector component VCO1 as that of the node C and that is neighbored to the node C is stored. Thus, the fact that there is no neighbored storage device towards the lower limit of the storage device identifiers SID, and the node E, are stored.

In Lev01(2), the storage device that has the same upper two digits of the first vector component VCO1 as those of the node C and that is neighbored to the storage device 10 is stored. Thus, the fact that there is no neighbored storage device towards the lower limit of the storage device identifier SID, and the node F, are stored.

In the present example, the condition for decision is coincidence of the numbers of digit(s) designated from the upper most digit of the first vector component VCO1, only by way of illustration. It is also possible that the digit(s) designated from the lower most digit of the first vector component VCO1 being the same may also be used as the condition for decision.

The above is the explanation for the algorithm A.

Next, the algorithm B will be explained.

In the algorithm B, in moving from a given storage device to another designated storage device, it is determined, in a progressively increasing order of the values of the first search level Lev01, whether or not the storage device designated or the storage device ahead of the storage device designated is storing the object data. At the highest value of the first search level Lev01, movement is made to the storage device which is ahead of the storage device designated and which is storing the object data. Note that the storage device ahead of the storage device designated may include no other than the storage device designated. By iterating such movement, it is possible to reach the storage device designated.

[Exemplary Embodiment 1]

Next, an exemplary embodiment 1 will be explained in detail with reference to the drawings.

The schematics of the operation of a storage device 20 of the subject exemplary embodiment are approximately the same as those of the storage device 10. That is, the storage device 20 stores object data and processes an access command accepted from outside. In case the storage device 20 itself is not storing object data, the access command is transferred to another storage device.

Note that this transfer is executed to a storage device closer to the storage device storing object data than the storage device 20. In determining whether storage devices are closer to or further from one another, the storage device identifier SID is again used in the subject exemplary embodiment. The procedure in deciding on the storage device of the transfer destination with the use of the storage device identifier SID will be explained subsequently.

Note that an object data identifier, paired to object data, is used in the storage device 20 of the subject exemplary embodiment as well. The object data identifier is paired with the object data and plays the role to uniquely determine the object data.

If now an access command is issued from outside to the storage device 20, the access command and the object data identifier are delivered to a system made up by a plurality of storage devices. If the storage device 20 itself is not storing the object data designated by the access command, the latter is transferred to a storage device closer than the storage device 20 to the storage device storing the object data, as described above.

Thus far, the subject exemplary embodiment is similar to the above mentioned storage device 10. However, the storage device 20 of the subject exemplary embodiment uses, in deciding on the storage device of the transfer destination, not only the information concerning the storage devices existing in the system but also the information concerning the storage device identifiers SID destitute of the storage devices matched thereto as well as the information concerning the storage devices managing the storage device identifiers SID. It is in this respect that the storage device of the subject exemplary embodiment differs from the storage device 10 that uses just the information concerning the storage devices existing in the system. The storage devices managing the storage device identifiers SID are referred to below as the management storage devices.

Figure 8:
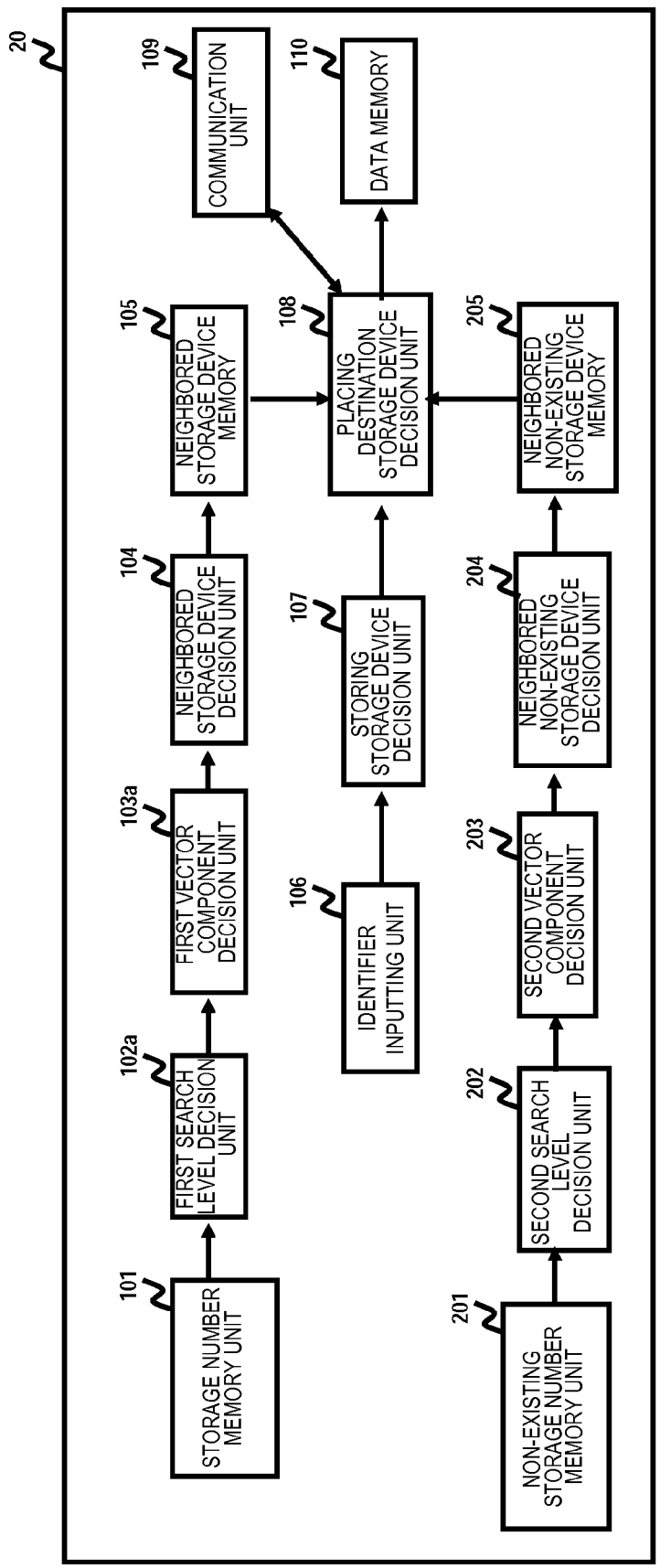
FIG. 8 is a block diagram showing an example inner configuration of a storage device 20 according to an exemplary embodiment 1.

FIG. 8 depicts an example inner configuration of the storage device 20 of the subject exemplary embodiment. In FIG. 8, the parts or components which are the same as those in FIG. 4 are depicted by the same symbols and the corresponding explanation is dispensed with.

The storage device 20 includes a storage number memory unit 101, a first search level decision unit 102a, a first vector component decision unit 103a, a neighbored storage device decision unit 104, a neighbored storage device memory 105, an identifier input unit 106, a storing storage device decision unit 107, a placing destination storage device decision unit 108, a communication unit 109, and a data memory 110. In addition, the storage device includes a non-existing storage number memory unit 201, a second search level decision unit 202, a second vector component decision unit 203, a neighbored non-existing storage device decision unit 204 and a neighbored non-existing storage device memory 205. Note that the first search level decision unit 102a is the same as the search level decision unit 102, while the first vector component decision unit 103a is the same as the vector component decision unit 103. Hence, the explanation on the first search level decision unit 102a and the first vector component decision unit 103a is dispensed with.

The non-existing storage number memory unit 201 stores the number of non-existing storage device identifiers NONSID, that is, the storage devices that, though having corresponding identifiers, do not in exist.

The second search level decision unit 202 calculates the second search level Lev02, based on the number of non-existing storage device identifiers NONSID.

The second vector component decision unit 203 calculates a second vector component VCO2 of the non-existing storage device identifiers NONSID of the storage device 20.

The neighbored non-existing storage device decision unit 204 generates the non-existing storage device identifiers NONSID to be stored in the neighbored non-existing storage device memory 205.

The neighbored non-existing storage device memory 205 stores the non-existing storage device identifiers NONSID, and the information concerning the neighbored non-existing storage devices, that is, the information concerning the storage devices managing the non-existing storage device identifiers NONSID.

The communication unit 109 is connected to the placing destination storage device decision unit 108 in FIG. 8 as well. However, the communication unit is able to exchange the information with other parts or components inside the storage device 20 as necessary.

Next, the operation of the storage device 20 will be explained.

The storage device 20 stores the object data while processing an access command accepted from outside. It may be thought that the storage device 20 executes the processing of the access command under the following two situations.

A first one of the situations is that in which the storage device 20 itself is storing the object data and executes the processing consistent with the access command (that is, the processing of write or read) to return the result of the execution to e.g., the device that issued the access command.

The second situation is that in which the storage device 20 itself is not storing the object data and transfers the access command to one other storage device(s) storing the object data. The transfer in this case is executed to a storage device closer to the storage device storing the object data than the storage device 20. The procedure to decide on the storage device identifier and the storage device of the transfer destination will be explained subsequently.

There is also an object data identifier paired to the object data. The object data identifier explicitly identifies the storage device storing object data. An access command is entered from outside into the storage device 20, at the same time as an object data identifier is entered.

The object data identifier is entered to the storage device 20 via the identifier input unit 106. The storing storage device decision unit 107 of the storage device 20 decides on the storage device storing the object data by relying upon the object data identifier.

The information concerning the storing storage device also is entered to the placing destination storage device decision unit 108. There are also cases where the access command is transferred from some other storage device included in the system. In this case, the storing storage device is already decided on, such that the information concerning the storing storage device is transferred along with the access command.

Thus, the information concerning the storing storage device is entered to the placing destination storage device decision unit 108 via the identifier input unit 106 and the storing storage device decision unit 107.

The placing destination storage device decision unit 108 determines whether or not the storage device 20 itself is storing the target object data. To this end, the neighbored storage device information, stored in the neighbored storage device memory 105, the neighbored non-existing storage device information stored in the neighbored non-existing storage device memory 205 and the information concerning the storing storage device are used.

In case the storage device 20 itself is storing the object data, the data memory 110 is accessed, and the object data is returned to the storage device that issued the access command or to an external device.

In case the storage device 20 itself is not storing the object data, the access command and the information concerning the storing storage device are transferred, via the communication unit 109, to the storage device of the transfer destination as decided on by the placing destination storage device decision unit 108.

Next, an algorithm to store the information concerning the neighbored non-existent storage devices and an algorithm to decide on the storage device of the transfer destination will be explained. It is noted that explanation of the algorithm to store the information concerning the neighbored storage device has already been made and hence no further explanation is to be made here for simplicity.

Initially, the algorithm to store the information concerning the neighbored non-existing storage devices will be explained.

Figure 9:
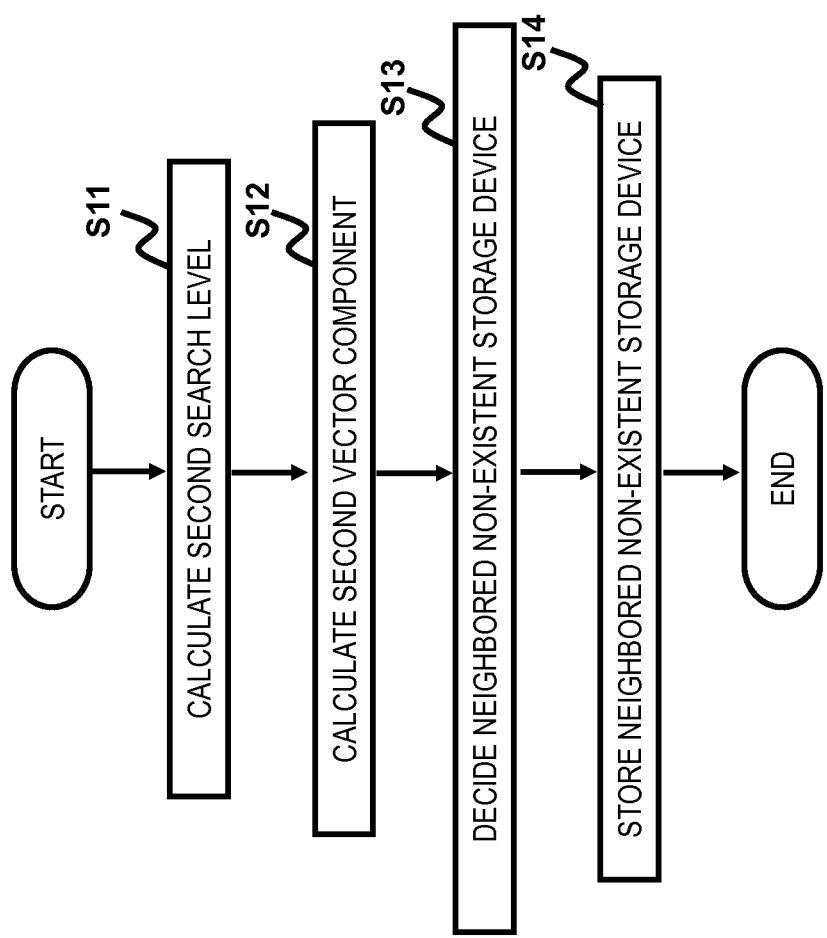
FIG. 9 is a flowchart showing an example algorithm for storing the information concerning the neighbored non-existing storage devices.

FIG. 9 depicts a flowchart showing an example algorithm to store the information concerning the neighbored non-existing storage devices.

In a step S11, the second search level decision unit 202 calculates the second search level Lev02. The non-existing storage number memory unit 201 is storing the number NONSNO of non-existing storage device identifiers indicating the number of the non-existing storage device identifiers NONSID. The search level decision unit 202 calculates a base-2 log of the number NONSNO of the non-existing storage devices. The second search level decision unit then rounds up the subdecimal part of the log value and subtracts 1 from the rounded number to find the second search level Lev02. In case the value of the second search level Lev02 is negative (minus), the second search level Lev02 is set to 0.

Note that a series of consecutive non-existing storage device identifiers NONSID are to be thought of as a lump of non-existing storage device identifiers NONSID. In short, even though the numbers of the non-existing storage device identifiers NONSID are consecutive numbers, a sole non-existing storage device identifier NONSID represents the other non-existing storage device identifiers NONSID.

In a step S12, the second vector component decision unit 203 calculates the second vector component VCO2.

The second vector component decision unit 203 calculates a hash value of the non-existing storage device identifier NONSID. The calculated hash value is expressed in binary notation and put to calculations to find a remainder so that the number of digits will be matched to the second search level Lev02. The result of the calculations to find the remainder is to be the second vector component VCO2.

In a step S13, the neighbored non-existing storage device decision unit 204 decides on the information concerning the neighbored non-existing storage devices. At this time, the neighbored non-existing storage device decision unit 204 decides on the information concerning the neighbored non-existing storage devices by an algorithm C. The algorithm C will be explained subsequently.

In a step S14, the information concerning the neighbored non-existing storage devices is stored in the neighbored non-existing storage device memory 205.

The algorithm C will now be explained.

Similarly to the algorithm A, the algorithm C represents a processing equivalent to the above mentioned organizing processing. The algorithm C decides on a neighbored non-existing storage device from one value to another of the second search level Lev02. Note that a series of consecutive non-existing storage device identifiers NONSID are to be thought of as a lump of non-existing storage device identifiers NONSID, as stated above. In short, a single non-existing storage device identifier NONSID represents the other non-existing storage device identifiers NONSID having such consecutive numbers.

There may be a variety of methods to select the single representative non-existing storage device identifier NONSID. In the subject exemplary embodiment, the non-existing storage device identifier NONSID present on an outermost side of, that is, farthest from, the storage device identifier SID of the storage device 20, is selected as such representative non-existing storage device identifier NONSID.

To find the second vector component VCO2 of the non-existing storage device identifier NONSID, a hash value is calculated from the non-existing storage device identifier NONSID. The calculated hash value is expressed in binary notation and put to calculations to find a remainder so that the number of digits will be matched to the second search level Lev02 in binary notation. The result of the calculations is the second vector component VCO2.

As the management storage device, managing the non-existing storage device identifiers NONSID, a storage device having a storage device identifier 1067 on an outer side by 1 of the non-existing storage device identifier NONSID, with the storage device 20 as a basic point, is set.

There are cases where there is no management storage device. In such case, the fact that there is no management storage device is stored. Or, it is assumed that an upper limit identifier and a lower limit identifier are linked together in a ring form. In this case, a storage device having a storage device identifier SID present on an outer side by 1 may be stored as the management storage device.

Figure 10:
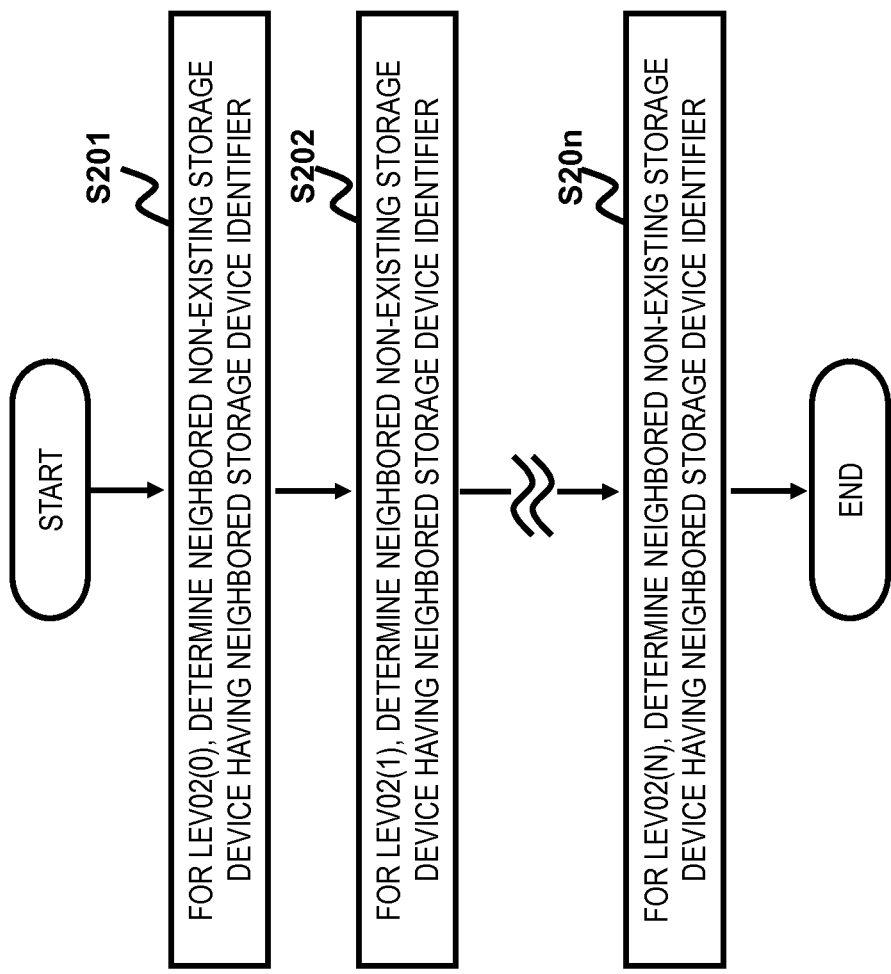
FIG. 10 is a flowchart showing example processing contents of an algorithm C.

FIG. 10 depicts a flowchart showing example processing contents of the algorithm C.

In a step S201, the neighbored non-existent storage device is decided on for Lev02(0). In this step, the non-existing storage device identifier NONSID smaller than and closest to the storage device identifier SID of the storage device 20 and the management storage device managing this non-existing storage device identifier NONSID are stored.

Next, the non-existing storage device identifier NONSID that is greater than and closest to the storage device identifier SID of the storage device 20 and the management storage device managing this non-existing storage device identifier NONSID are stored.

In a step S202, the neighbored non-existent storage device is decided on for Lev02(1). In Lev02(1), the non-existing storage device identifier NONSID that has the same upper one digit of the second vector component as the storage device 20 and that is smaller than and closest to the storage device identifier SID of the storage device 20, and its management storage device, are stored.

Next, the non-existent storage device identifier NONSID, greater than and closest to the storage device identifier SID of the storage device 20, and its management storage device, are stored.

In a step S20n, for Lev02(n), the non-existing storage device identifier NONSID that has the same upper (n) digits of the second vector component VCO2 as the storage device 20 and that is smaller than while being closest to the storage device identifier SID of the storage device 20, and its management storage device, are stored.

Next, the non-existent storage device identifier NONSID, greater than and closest to the storage device identifier SID of the storage device 20, and its management storage device, are stored.

If the non-existing storage device identifier NONSID that has the same upper (n) digits of the second vector component VCO2 as the storage device 20 has been searched down to the limit of the storage device identifiers SID but has not been found, the fact that the non-existing storage device identifier NONSID as well as its management storage device does not exist is stored. Or, it is assumed that an upper limit identifier and a lower limit identifier are linked together in a ring form. In this case, the closest non-existing storage device identifier NONSID as well as its management storage device may be stored.

In storing the non-existing storage device identifier NONSID, not only the representative non-existing storage device identifier NONSID but also other non-existing storage device identifiers NONSID, treated in a lump, are stored.

In the present example, the coincidence of the numbers of digits designated from the upper order side of the second vector component VCO2 is used as the condition for conclusion. This, however, is not restrictive, such that it is also possible to use the coincidence of the numbers of digits designated from the lower order side of the second vector component VCO2 as the condition for conclusion.

Next, a concrete example of deciding on the neighbored storage device by the algorithm C will now be explained.

Figure 11:
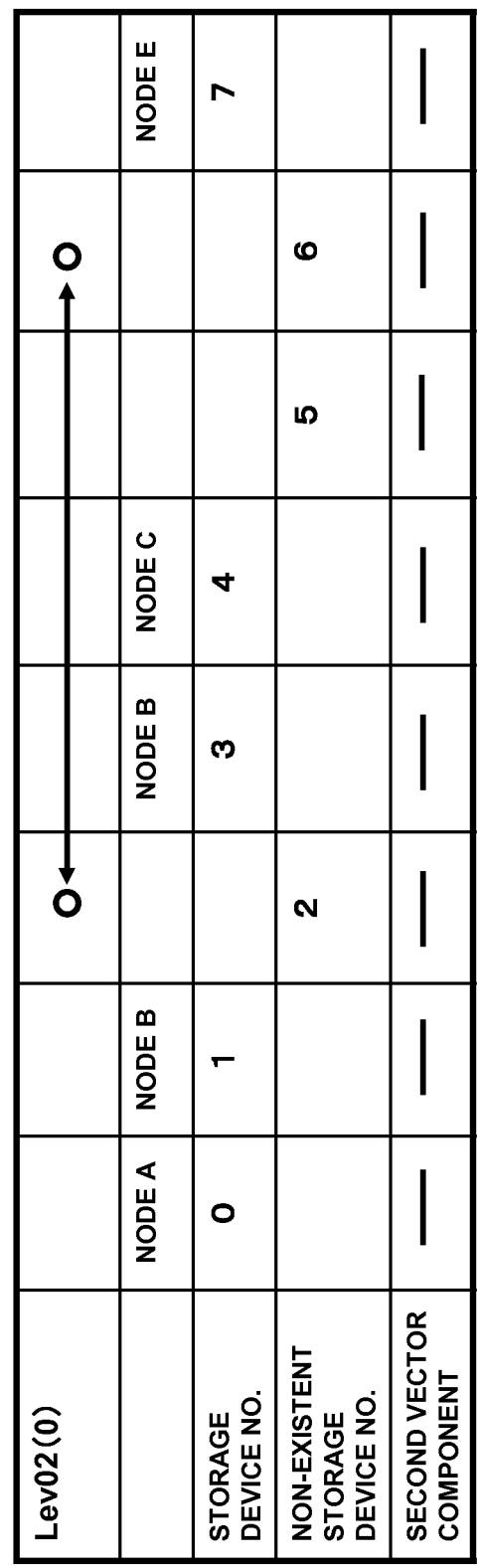
FIG. 11 is a graphic view for illustrating the algorithm C.

FIG. 11 is a graphic view to illustrate the algorithm C.

In FIG. 11, consecutive storage device numbers, which are integers of from 0 to 7, are used as the storage device identifiers SID. Specifically, 0, 1, 3, 4 and 7 are assigned respectively to the nodes A, B, C, D and E as storage device numbers.

There exist no matching nodes for storage device numbers 2, 5, 6, these numbers thus being non-existing storage device identifiers NONSID. Here, the information concerning the neighbored non-existing storage devices for the node C is taken up for consideration.

The management storage device for the non-existing storage device identifier NONSID 2 is the node B. The non-existing storage device identifiers NONSID 5 and 6 are consecutive to each other and may thus be treated as a lump of the non-existing storage device identifiers NONSID. Hence, the representative non-existing storage device identifier NONSID is defined as 6, its management storage device being the node E.

Since the non-existing storage device identifiers NONSID are 2 and 6, the second search level Lev02 is 0. Note that the non-existing storage device identifiers NONSID 5, 6 are consecutive to each other and thus are represented by 6.

A hash value of the non-existing storage device identifier NONSID 2 is calculated and put to calculations to find a remainder. The result of the calculations to find the remainder is the second vector component VCO2 of the non-existing storage device identifier NONSID 2. However, since the second search level Lev02 is 0, the second vector component VCO2 does not exist. The second vector component VCO2 does not exist for the node C as well as for the non-existing storage device identifiers NONSID 5, 6.

In Lev02(0), the non-existing storage device identifier NONSID, neighbored to the node C, is selected. Hence, the non-existing storage device identifier NONSID 2 and the management node B relevant to it are selected as the neighbored non-existing storage device information. At the same time, the management node E, matched to the non-existing storage device identifiers NONSID 5, 6, is selected as the neighbored non-existing storage device information.

The above is the explanation on the algorithm C.

It is noted that numerical data or programs stating a preset processing such as algorithms may be thought of as object data. The system including the storage device 20 of the subject exemplary embodiment has been explained as a system in which a plurality of storage devices physically exist and are interconnected over a communication signal path. This, however, is not meant to be restrictive. A plurality of virtual storage devices may be provided within the storage device. Or, a plurality of other storage devices may be provided within a storage device and a virtual storage device may be constructed within each of the storage devices. The same applies for the following exemplary embodiments.

In the subject exemplary embodiment, in a system in which object data are stored distributed in a plurality of storage devices, the number of the non-existing storage device identifiers NONSID, lacking in matched storage devices, may be small. In such case, the storage device storing the object data may be accessed with a smaller number of hops than in case the storage device storing the object data is accessed using just the information of the storage device identifiers SID existing in the system.

It is noted that the volume of the information that should be additionally stored in the storage devices is of the order of the log of the number of the storage device identifiers lacking in matched storage devices. Thus, with the technique according to the subject exemplary embodiment, it is possible to access the storage device storing object data with a smaller number of hops, even in a system destined for an extremely large number of storage devices, as in a large sized datacenter, it being necessary that just a smaller volume of the information is stored.

[Example]

Next, the configuration and the operation of the storage device 20 will be explained with reference to a concrete example.

Figure 12:
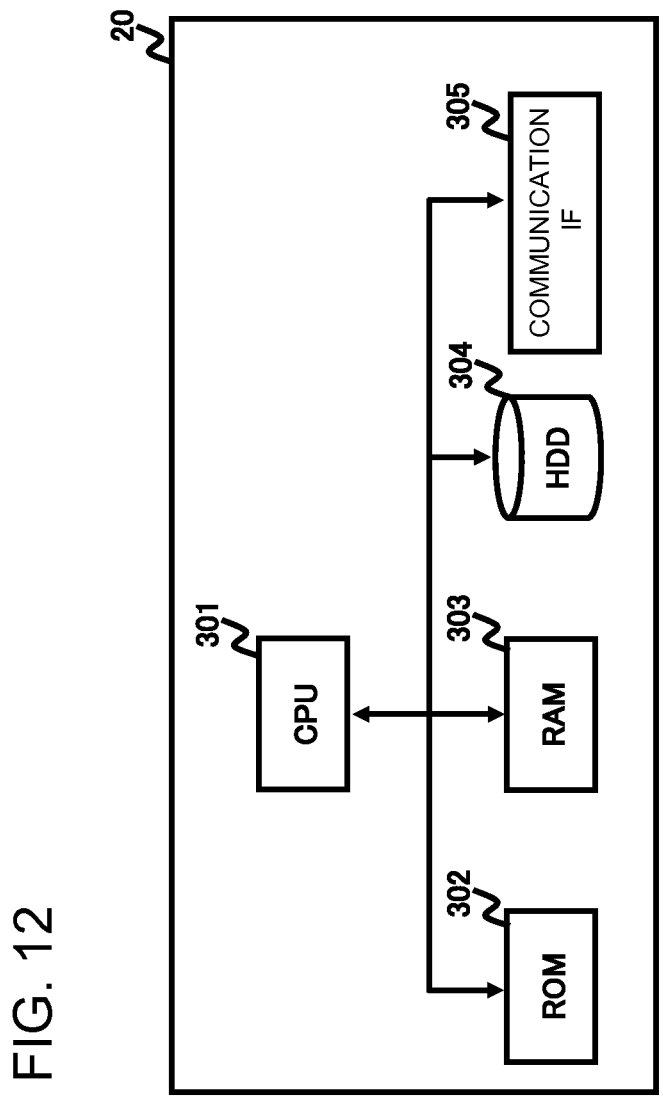
FIG. 12 is a schematic view showing an example hardware configuration of a storage device 20 of an exemplary embodiment 1.

FIG. 12 schematically shows an example hardware configuration of a storage device 20 according to an exemplary embodiment. FIG. 12 shows an example configuration of a computer that is capable of implementing the storage device 20, and represents a hardware environment that is capable of implementing respective functions in the exemplary embodiment 1.

The hardware configuration, shown in FIG. 12, is made up by a CPU (Central Processing Unit) 301, a ROM (Read Only Memory) 302, a RAM (Random Access Memory) 303, a hard disk (memory) 304 and a communication interface 305. These components are interconnected over a bus.

It may be presumed that the hard disk 304 itself operates as a storing storage device in the exemplary embodiment 1. The functions explained using flowcharts (FIG. 5, FIG. 6, FIG. 9 and FIG. 10) may be implemented by being provisioned with a competent program and reading it out to the CPU 301 to run the so read-out program. The program, thus provisioned to the storage device, may also be stored in the read/write RAM 302 or in the hard disk 304.

In provisioning the program, it may be installed via a variety of recording mediums, such as CD-ROM, or downloaded from outside via a communication network, such as the Internet. In this case, the program is provided by a program code or by a recording medium. Note that the storage device 20, explained in connection with the exemplary embodiment 1, may be implemented by a devoted hardware.

Figure 13:
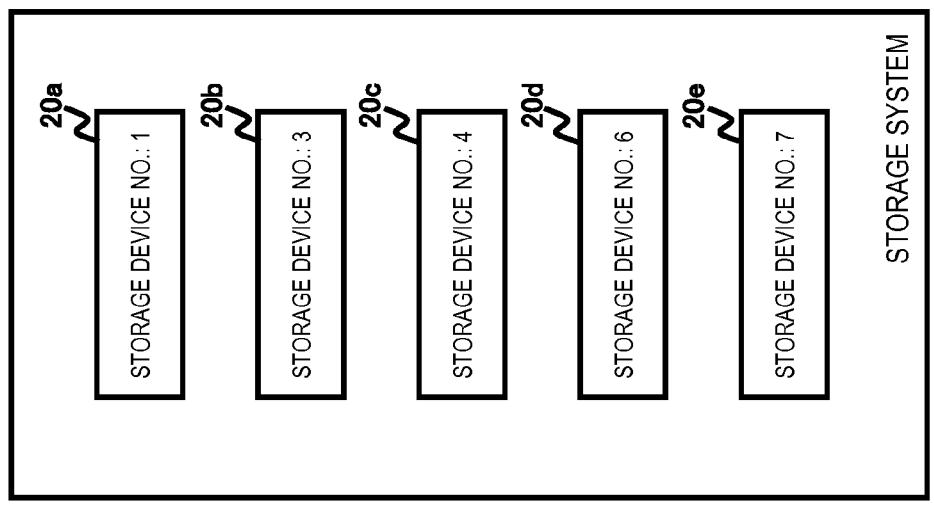
FIG. 13 is a block diagram showing an example storage device included in a storage system.

FIG. 13 shows that five storage devices 20a to 20e are included in a storage system.

Each of the five storage devices has a storage device number as an identifier. The storage device 20a has a storage device number 1, the storage device 20b has a storage device number 3, and the storage device 20c has a storage device number 4. The storage device 20d has a storage device number 6 and the storage device 20e has a storage device number 7.

Figure 14:
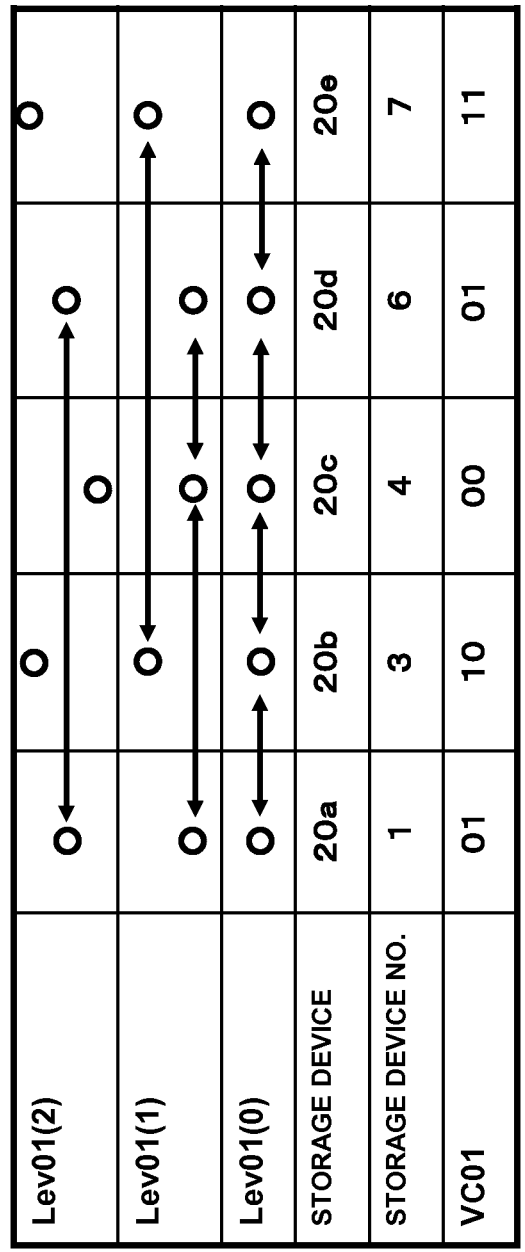
FIG. 14 is a graphic view for illustrating calculations of the information concerning the neighbored storage devices.

Initially, the information concerning the neighbored storage devices is calculated (see FIG. 14). Since the number of the storage devices is 5, the first search level Lev01 is 2. Next, the hash value, calculated from the numbers of the respective storage devices, is put to calculations to find a remainder with 4. In this way, a binary representation of the first vector component VCO1 may be found.

As a result, the first vector component VCO1 of the storage device 20a is 01, the first vector component VCO1 of the storage device 20b is 10 and the first vector component VCO1 of the storage device 20c is 00. The first vector component VCO1 of the storage device 20d is 01 and the first vector component VCO1 of the storage device 20e is 11.

Next, in deciding on the information concerning the neighbored storage device, the case where the first search level Lev01 is 0 is taken up for consideration.

The storage device 20a stores the fact that there exists no storage device whose number is smaller than that of the storage device 20a itself, and the storage device 20b. The storage device 20b stores the storage devices 20a and 20c. The storage device 20c stores the storage devices 20b and 20d. The storage device 20d stores the storage devices 20c and 20e. The storage device 20e stores the storage device 20d and the fact that there exists no storage device whose number is greater than that of the storage device 20e itself.

Next, the case where the first search lev01 is 1 is taken up for consideration.

The storage device 20a stores the fact that there exists no storage device whose number is smaller than that of the storage device 20a itself, and the storage device 20c. The storage device 20b stores the fact that there exists no storage device whose number is smaller than that of the storage device 20b itself, and the storage device 20e. The storage device 20c stores the storage devices 20a and 20d. The storage device 20d stores the storage device 20c and the fact there exists no storage device whose number is greater than that of the storage device 20d itself. The storage device 20e stores the storage device 20b and the fact there exists no storage device whose number is greater than that of the storage device 20e.

Next, the case where the first search Lev01 is 2 is taken up for consideration.

The storage device 20a stores the fact that there exists no storage device whose storage device number is smaller than that of the storage device 20a itself, and the storage device 20d. The storage device 20b stores the fact that there exists no storage device whose storage device number is smaller than that of the storage device 20b itself, and the fact that there exists no storage device whose storage device number is greater than that of the storage device 20b. The storage device 20c stores the fact that there exists no storage device whose storage device number is smaller than that of the storage device 20c itself, and the fact that there exists no storage device whose storage device number is greater than that of the storage device 20c. The storage device 20d stores the storage device 20a and the fact that there exists no storage device whose storage device number is greater than that of the storage device 20d itself. The storage device 20e stores the fact that there exists no storage device whose storage device number is smaller than that of the storage device 20e itself, and the fact that there exists no storage device whose storage device number is greater than that of the storage device 20e.

Next, the calculations of the information concerning the neighbored non-existing storage devices will be explained.

FIG. 15 is a graphic view to illustrate the calculations of the information concerning the neighbored non-existing storage devices. The storage device numbers in FIG. 14 are integers of from 0 to 7. Since the number of the non-existing storage devices NONSNO is 3, the second search level Lev02 is 1. Hash values of the storage device numbers of the storage devices and the non-existent storage device numbers of the non-existing storage devices are put to calculations to calculate a remainder with 2 to find the values of the second vector component VCO2. As a result, decisions are made that the VCO2 of the non-existent storage device number 0 is 1, that of the storage device number 1 is 0, that of the non-existent storage device number 2 is 0, that of the storage device number 3 is 1, that of the storage device number 4 is 0, that of the non-existent storage device number 5 is 1, that of the storage device number 6 is 1 and that of the storage device number 7 is 1.

Next, the information concerning the neighbored non-existing storage devices is decided on.

Initially, the case where the second search level Lev02 is 0 is taken up for consideration.

The storage device 20a stores the non-existing storage device number 0, the fact that there exists no storage device managing the non-existing storage device number, that is, that there exists no storage device having a storage device number smaller than 0, the non-existing storage device number 2 and the storage device 20b managing the non-existing storage device number. The storage device 20b stores the non-existing storage device number 2, the storage device 20a managing the non-existing storage device number, the non-existing storage device number 5 and the storage device 20d managing the non-existing storage device number. The storage device 20c stores the non-existing storage device number 2, the storage device 20a managing the non-existing storage device number, the non-existing storage device number 5 and the storage device 20d managing the non-existing storage device number. The storage device 20d stores the non-existing storage device number 5, the storage device storage device 20c managing the non-existing storage device number and the fact that there exists no non-existing storage device whose non-existing storage device number is greater than the storage device number of the storage device 20*d* itself. The storage device 20*e* stores the non-existing storage device number 5, the storage device 20*c* managing the non-existing storage device number and the fact that there exists no non-existent storage device whose non-existing storage device number is greater than the storage device number of the storage device 20*e* itself.

Next, the case where the second search level Lev02 is 1 is taken up for consideration.

The storage device 20*a* stores the non-existing storage device number 2, the storage device 20*b* managing the non-existing storage device number and the fact that there exists no non-existing storage device whose non-existing storage device number is smaller than the storage device number of the storage device 20*a* itself. The storage device 20*b* stores the non-existing storage device number 0, the fact that there exists no storage device managing the non-existing storage device number, the non-existing storage device number 5 and the storage device 20*d* managing the non-existing storage device number. The storage device 20*c* stores the non-existing storage device number 2, the storage device 20*a* managing the non-existing storage device number and the fact that there exists no non-existing storage device whose non-existing storage device number is greater than the storage device number of the storage device 20*c* itself. The storage device 20*d* stores the non-existing storage device number 5, the storage device 20*c* managing the non-existing storage device number and the fact that there exists no non-existing storage device whose non-existing storage device number is greater than the storage device number of the storage device 20*d* itself. The storage device 20*e* stores the non-existing storage device number 5, the storage device 20*c* managing the non-existing storage device number and the fact that there exists no non-existing storage device whose non-existing storage device number is greater than the storage device number of the storage device 20*e* itself.

It is seen from above that the number of information pieces of other storage devices stored by each storage device is of the order of log (number of the storage devices) provided that the subdecimal part of the log is rounded up. On the other hand, the number of information pieces of other neighbored non-existent storage devices stored by each storage device is of the order of log (number of the neighbored non-existent storage devices) provided that the subdecimal part of the log is rounded up.

It is noted that, in a storage system containing a plurality of storage devices 20, the storage devices storing the object data may be decided in the following manner.

A hash value is calculated from an identifier of object data and put to calculations to find a remainder with a value corresponding to a maximum value that can be assumed by the storage device number plus 1. It is confirmed whether or not there exists a storage device having the storage device number equal to the result of the calculations performed in order to find the remainder.

If there exists such storage device, the object data is stored in the storage device. If there exists no such storage device, a further hash value is found from the hash value and put to calculations to find a remainder with a value corresponding to a maximum value that can be assumed by the storage device number plus 1. This sequence of operations is iterated until a value which is the same as the existing storage device number is output.

For example, it is presumed that the storage device 20*e* has issued an access command to have object data owning an object data identifier stored in the storage system. A hash value is calculated from the object data identifier and put to calculations to find a remainder with a value corresponding to a maximum value that can be assumed by the storage device number plus 1. It is presumed that the result of the calculations is 0.

In this case, it is confirmed that there exists a storage device having the storage device number equal to 0. After confirming that the storage device 20*e* itself is not the storage device having the storage device number of 0, the storage device 20*e* confirms that the storage device number 0 is not contained in the non-existent storage device number(s) owned by the storage device 20*e*.

The storage device 20*e* further selects a number which is the storage device number or the non-existent storage device number owned by it and which is between the storage device numbers 0 and 7 while being closest to the storage device number 0. In this case, the storage device 20*b* having the storage device number equal to 3 is selected. Hence, the access command is transferred to the storage device 20*b*.

On reception of the access command, the storage device 20*b* confirms that the storage device 20*b* itself is not the storage device having the storage device number 0. The storage device 20*b* then confirms that the storage device number 0 is among the non-existent storage device numbers owned by the storage device 20*b*. By this, it maybe confirmed that there exists no storage device having the storage device number 0. From the results of hashing of the object data identifier, a further hash value is calculated and put to calculations to find a remainder with a value corresponding to a maximum value that can be assumed by the storage device number plus 1. It is assumed that the result of the calculations is 5.

The storage device 20*b* then confirms that the storage device 20*b* itself is not the storage device having the storage device number 5, and thereafter confirms that the storage device number 5 is among the non-existing storage device numbers owned by the storage device 20*b*. By this, it may be confirmed that there exists no storage device having the storage device number equal to 5.

Thus, from the results of hashing of the object data identifier, a further hash value is calculated and put to calculations to find a remainder with a value corresponding to a maximum value that can be assumed by the storage device number plus 1. It is assumed that the result of the calculations is 1.

The storage device 20*b* then confirms that the storage device 20*b* itself is not the storage device having the storage device number 1, and thereafter confirms that the storage device number 1 is not among the non-existing storage device numbers owned by the storage device 20*b*. Such number is selected that is among the storage device numbers and the non-existing storage device numbers owned by the storage device 20*b* and that is between the storage device number 1 and the storage device number 3 while being closest to the storage device number 1.

In this case, the storage device 20*a* having the storage device number 1 is selected, and hence the access command is transferred to the storage device 20*a*. The storage device 20*a* then confirms that the storage device 20*a* itself owns the storage device number 1. As a result, the storage device storing the object data is concluded to be the storage device 20*a*, which storage device 20*a* executes the access command.

[Exemplary Embodiment 2]

Next, an exemplary embodiment 2 will be explained in detail with reference to the drawings.

Figure 16:
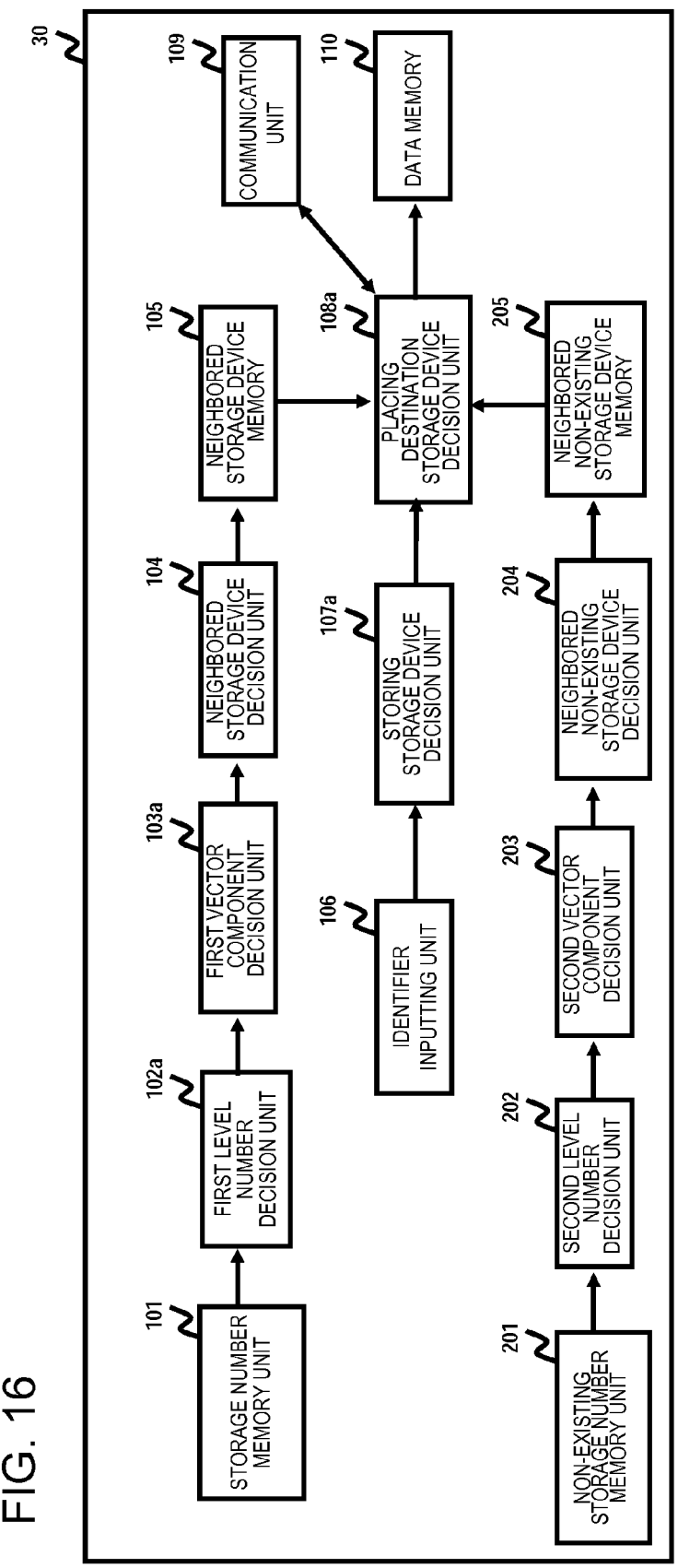
FIG. 16 is a block diagram showing an example inner configuration of a storage device 30 according to an exemplary embodiment 2.

FIG. 16 depicts an example inner configuration of a storage device 30 according to the subject exemplary embodiment. In FIG. 16, the parts or components which are the same as those shown in FIG. 8 are denoted by the same symbols and the corresponding description is dispensed with.

The storage device 30 receives an access command issued by another storage device or other sort devices. If the storage device 30 is storing object data of the access destination of the access command, it executes the command.

If the storage device 30 is not storing the object data, it transfers the access command to another storage device in accordance with a preset algorithm. It is noted that, in the subject exemplary embodiment as well, the object data is at least one out of numerical values and software programs stored in the storage device 30. The software programs are those stating preset processing (processes, functions or algorithms).

The storage device 30 differs from the storage device 20 of the exemplary embodiment 1 as to the processing of selecting the storing storage device in a storage device 107a and as to the algorithm executed by a placing destination storage device decision unit 108a. It is probable that the storing storage device 107a of the storage device 30 selects a storage device non-existent in the system as a storing storage device.

The algorithm executed by the placing destination storage device decision unit 108a is here set as an algorithm D. It is probable that the storing storage device decision unit 107a of the storage device 30 selects a storage device non-existing in the system. In such case, selection of the storage device is again executed and processing is reiterated until selecting the storage device existing in the system by way of deciding on the storing storage device existing in the system.

Here, the algorithm D will be explained.

The algorithm D is such an algorithm in which processing for a case where the storing storage device has been confirmed to exist differs from that for a case where the storing storage device has not been confirmed to exist.

Figure 17:
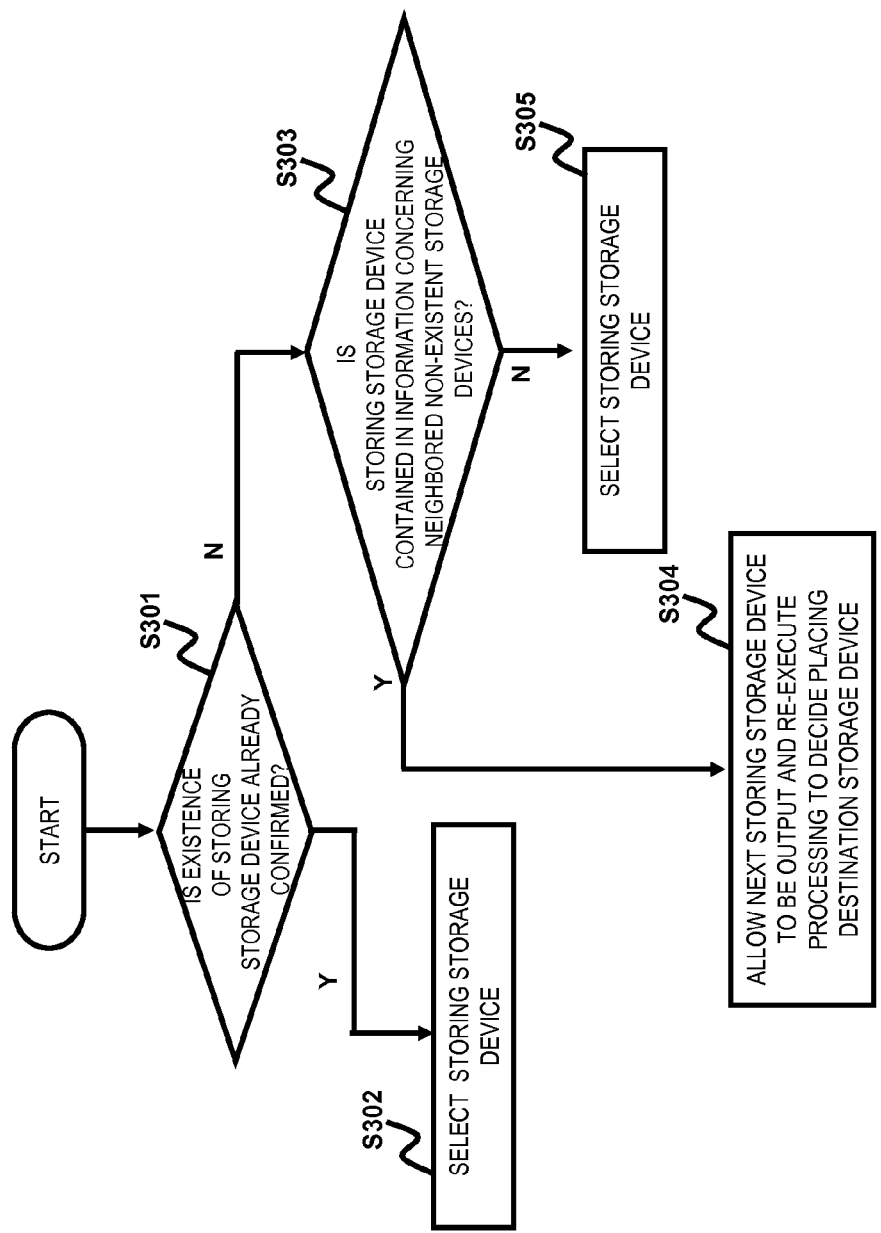
FIG. 17 is an example flowchart for illustrating an algorithm D.

FIG. 17 depicts an example flowchart to explain the algorithm D.

In a step S301, it is concluded whether or not the storing storage device has been confirmed to exist. If the storing storage device has been confirmed to exist, processing transfers to a step S302. If otherwise, processing transfers to a step S303.

In the step S302, such a storage device whose storage device identifier is between the storage device identifier of the storage device 30 executing the algorithm D and the storage device identifier of the storing storage device and is closest to the storage device identifier of the storing storage device is selected from among the storage devices contained in the information concerning the neighbored storage devices and the information concerning the neighbored non-existing storage devices. In this case, there is a possibility that the storing storage device is selected as the storage device of the transfer destination.

In the step S303, it is concluded whether or not the storing storage device is contained in the information concerning the neighbored non-existing storage devices. In case the storing storage device is so contained, processing transfers to a step S304. In case the storing storage device is not contained, processing transfers to a step S305.

The step S304 is the processing performed when the storing storage device has been confirmed to be present in the information concerning the neighbored non-existent storage devices, that is, when it has been confirmed that there exists no storing storage device. In this step S304, processing is returned by returning a storing storage device re-calculation command to the storing storage device decision unit 107a. The storing storage device decision unit 107a then has to output the next storing storage device so that the processing of the placing destination storage device decision unit 108a is again executed.

The step S305 is the processing performed when the storing storage device has been confirmed not to be present in the information concerning the neighbored non-existent storage devices. In the step S305, the same processing as that when the storing storage device has been confirmed to exist as described above is performed. That is, the processing similar to that of the step S302 is executed.

In such exemplary embodiment 2, as in the above mentioned exemplary embodiment 1, the storage device storing object data may be accessed with a number of hops smaller than in the method explained in Non-Patent Literature 1, in an environment in which object data are stored distributed to a plurality of storage devices, and in which the number of the identifiers not matched to existing storage devices is small. In this method of Non-Patent Literature 1, explained in connection with the related art technique, the storage device storing the object data is to be accessed using only the information concerning the identifiers for which the matched storage devices exist.

Also, the number of the information items that should be additionally stored by the storage device is on the order of the log of the number of the identifiers lacking in the matched storage devices. Thus, with the technique according to the subject exemplary embodiment, the storage device storing object data may be accessed with a smaller number of hops and with a smaller volume of the information, even in a system destined to handle an extremely large number of storage devices, as in a large sized datacenter.

In addition, in the exemplary embodiment 2, the storage device storing the object data can be accessed with a smaller number of hops even in case the algorithm for selecting the storage device storing object data is likely to select temporarily non-existing storage devices.

In the above described exemplary embodiments 1 and 2, it is assumed that the placement site of object data is a storage device storing the data. It is also assumed that the object data is at least one of the numerical data and software programs stating preset processing (processes, functions or algorithms). However, this is not to be taken to be restrictive. For example, the object data may be processing (commands, processes, functions, program codes or algorithms). In this case, the placement site of the objects is the environment of executing calculations (environment of executing the processing) such as a processor or an IP core (Intellectual Property Core) in which the processing is to be executed.

Moreover, in an exemplary embodiment applied to an environment for executing the calculations, which is a placement site, it is possible to improve the processing efficiency by, for example, load distribution or balancing among a plurality of servers.

It is also possible to replace object data by physical entities or to replace storage devices by transfer destination sites or saving sites for such physical entities. It may also be contemplated to select a plurality of storage devices as the sites for placement of object data.

Preferred modes will now be recited.

(Mode 1)

The mode 1 is the same as the object placement apparatus according to the first aspect.

(Mode 2)

The apparatus for object placement is provided, in which the placement site search unit searches the placement site for the object using a fraction of information concerning the first identifiers and a fraction of information concerning the second identifiers.

(Mode 3)

The apparatus for object placement further comprises a placement site decision unit that decides the placement site of the object based on the first and second identifiers. In case the second placement site is designated as the placement site for the object, the placement site decision unit reiterates designating the placement site for the object and confirming existence of the placement site for the object such as to designate the first placement site.

(Mode 4)

The apparatus for object placement is provided, in which the placement site decision unit designates a number of placement sites designated as placement sites for the object. The placement site decision unit places the object in each of a plurality of placement sites.

(Mode 5)

The apparatus for object placement is provided, in which the object is a preset information processing and the placement site decision unit decides a site of execution of the information processing.

(Mode 6)

The apparatus for object placement is provided, in which the placement site for the object is a storage device. The object is object data which constitutes at least one of numerical data stored in the storage device and a software program stating a preset processing.

(Mode 7)

The apparatus for object placement is provided, in which the object is an article, and the placement site decision unit decides so as to sort the article to the placement site decided by the placement site decision unit.

(Mode 8)

The mode 8 is the same as the method for object placement according to the second aspect.

(Mode 9)

The method for object placement is provided, in which the step of searching the placement site for an object searches the placement site for the object using a fraction of information concerning the first identifiers and a fraction of information concerning the second identifiers.

(Mode 10)

The method for object placement further includes a placement site decision step of deciding the placement site for the object based on the first and second identifiers. In case the second placement site has been designated as the object placement site, the placement site decision step reiterates designating the placement site for the object and confirming the existence of the object placement site to designate the first placement site.

(Mode 11)

The mode 11 is the same as the program according to the third aspect.

(Mode 12)

The program is provided in which the processing for searching the placement site searches the placement site for the object based on a fraction of the information concerning first identifiers and a fraction of information concerning the second identifiers.

(Mode 13)

The program further comprises a placement site decision processing that decides the placement site for the object based on the first and second identifiers.

In case the second placement site is designated as the placement site for the object, the placement site decision processing reiterates designating the placement site for the object and confirming the existence of the placement site for the object to designate the first placement site.

The disclosures of the above mentioned Patent Publication and so forth are to be incorporated herein by reference. The particular Examples may be modified or adjusted within the gamut of the entire disclosure of the present invention, inclusive of claims, based on the fundamental technical concept of the invention. Moreover, a variety of combinations or selection of elements disclosed inclusive of the elements of claims, Examples and the drawings may be made within the concept of the claims. The present invention may encompass a wide variety of modifications or corrections that may occur to those skilled in the art in accordance with the entire disclosure of the present invention, inclusive of claims and the technical concept of the invention. Particularly, any numerical range disclosed herein should be interpreted that any intermediate values or subranges falling within the disclosed range are also concretely disclosed even without specific recital thereof.

REFERENCE SIGNS LIST 1, 10, 20, 20a to 20e, 30 storage devices
2, 106 identifier input units
3, 107, 107a storing storage device decision units
4, 108, 108a placing destination storage device decision units
5, 105 neighbored storage device memories
6, 205 neighbored non-existing storage device memories
7, 109 communication units
8, 110 data memories
101 storage number memory unit
102 search level decision unit
102a first search level decision unit
103 vector component decision unit
103a first vector component decision unit
104 neighbored storage device decision unit
201 non-existing storage number memory unit
202 second search level decision unit
203 second vector component decision unit
204 neighbored non-existing storage device decision unit
301 CPU
302 ROM
303 RAM
304 hard disk
305 communication interface
400 object placement apparatus
401 placement site search unit

What is claimed is:

1. An apparatus for object placement, comprising:
a processor;
a non-transitory computer-readable medium storing computer-executable code that the processor executes to:
store a number of a plurality of first storages existing in a system;
store a number of a plurality of second storages not existing in the system;

calculate a first number of layers to distribute the first storage based on the number of the first storage;
calculate a second number of layers to distribute the second storage based on the number of the second storage;
generate neighboring storage device information including information regarding the first storages whose identifiers are adjacent, for each of layers determined by the first number of layers;
generate neighboring non-existing storage device information including information regarding the second storage whose an identifier is adjacent to an identifier of the first storage, for each of layers determined by the second number of layers; and
when an object determined by an access command is not stored in own device, search a placement site based on a first vector element that has organized first identifiers for first placement sites existing in a system and on a second vector element that has organized second identifiers for second placement sites not existing in the system, using a fraction of information concerning the first identifiers and a fraction of information concerning the second identifiers,
wherein the object is accessed at the placement site that has been determined located as a result of searching, wherein the processor further executes the code to decide the placement site of the object based on the first and second identifiers, and wherein in case the second placement site is designated as the placement site for the object, the processor executes the code to reiterate designating the placement site for the object and confirming existence of the placement site for the object in order to designate the first placement site.

2. The apparatus for object placement according to claim 1, wherein,
the processor executes the code to designate a number of placement sites designated as the placement sites for the object-and place the object in a plurality of the placement sites.

3. The apparatus for object placement according to claim 1, wherein,
the object is a preset information processing and the processor executes the code to decide a site of execution of the information processing.

4. The apparatus for object placement according to claim 1, wherein, the object comprises object data which constitutes at least one of numerical data stored in the storage device and a software program stating a preset processing.

5. The apparatus for object placement according to claim 1, wherein, the object is an article; and the processor executes the code to decide so as to sort the article to the placement site decided.

6. A computer-implemented method for object placement, comprising:
providing a first storage unit that stores a number of a plurality of first storages existing in a system;
providing a second storage unit that stores a number of a plurality of second storages not existing in the system;
calculating a first number of layers to distribute the first storage based on the number of the first storage;
calculating a second number of layers to distribute the second storage based on the number of the second storage;
generating neighboring storage device information including information regarding the first storages whose identifiers are adjacent, for each of layers determined by the first number of layers;
generating neighboring non-existing storage device information including information regarding the second storage whose an identifier is adjacent to an identifier of the first storage, for each of layers determined by the second number of layers;
generating a first vector element that has organized first identifiers for first placement sites existing in the system;
generating a second vector element that has organized second identifiers for second placement sites not existing in the system;
searching a placement site for an object based on the first and second vector elements and based on the first and second identifiers, using a fraction of information concerning the first identifiers and a fraction of information concerning the second identifiers, wherein deciding the placement site of the object based on the first and second identifiers, and wherein in case the second placement site is designated as the placement site for the object, designating the placement site for the object is reiterated and existence of the placement site for the object is confirmed in order to designate the first placement site; and
accessing the object at the placement site.

7. A computer readable non-transitory medium storing a program that is executed by a computer, which includes a first storage unit that stores a number of a plurality of first storages existing in a system and a second storage unit that stores a number of a plurality of second storages not existing in the system, the program executes:
calculating a first number of layers to distribute the first storage based on the number of the first storage;
calculating a second number of layers to distribute the second storage based on the number of the second storage;
generating neighboring storage device information including information regarding the first storages whose identifiers are adjacent, for each of layers determined by the first number of layers;
generating neighboring non-existing storage device information including information regarding the second storage whose an identifier is adjacent to an identifier of the first storage, for each of layers determined by the second number of layers; and
generating a first vector element that has organized first identifiers for first placement sites existing in the system;
generating a second vector element that has organized second identifiers for second placement sites not existing in the system;
searching a placement site for an object based on the first and second vector elements and based on the first and second identifiers, using a fraction of information concerning the first identifiers and a fraction of information concerning the second identifiers, wherein deciding the placement site of the object based on the first and second identifiers, wherein in case the second placement site is designated as the placement site for the object, designating the placement site for the object is reiterated and existence of the placement site for the object is confirmed in order to designate the first placement site; and
the object is accessed at the placement site that has been located as a result of searching.

* * * * *